United States Patent
Spencer et al.

(10) Patent No.: US 9,424,246 B2
(45) Date of Patent: Aug. 23, 2016

(54) SYSTEM AND METHOD FOR INPUTTING TEXT INTO ELECTRONIC DEVICES

(71) Applicant: TOUCHTYPE LIMITED, London (GB)

(72) Inventors: Stephen Thomas Spencer, London (GB); Páidí Creed, London (GB); Benjamin William Medlock, London (GB); Douglas Alexander Harper Orr, Essex (GB)

(73) Assignee: TouchType Ltd., London (GB)

( * ) Notice: Subject to any disclaimer, the term of this patent is extended or adjusted under 35 U.S.C. 154(b) by 0 days.

(21) Appl. No.: 14/307,308

(22) Filed: Jun. 17, 2014

(65) Prior Publication Data
US 2014/0297267 A1    Oct. 2, 2014

Related U.S. Application Data

(63) Continuation-in-part of application No. 13/262,190, filed as application No. PCT/GB2010/000622 on Mar. 30, 2010, application No. 14/307,308, which is a continuation-in-part of application No. 13/501,087, filed as application No. PCT/GB2010/001898 on Oct. 11, 2010, now Pat. No. 9,046,932.

(30) Foreign Application Priority Data

Mar. 30, 2009 (GB) .................................. 0905457.8
Oct. 9, 2009 (GB) .................................. 0917753.6

(51) Int. Cl.
*G06F 17/21* (2006.01)
*G10L 15/18* (2013.01)
(Continued)

(52) U.S. Cl.
CPC ........... *G06F 17/276* (2013.01); *G06F 3/0237* (2013.01); *G10L 15/183* (2013.01)

(58) Field of Classification Search
CPC ..... G06F 3/0237; G06F 17/276; G10L 15/183
See application file for complete search history.

(56) References Cited

U.S. PATENT DOCUMENTS

| 5,467,425 A | 11/1995 | Lau et al. |
| 5,477,451 A | 12/1995 | Brown et al. |

(Continued)

FOREIGN PATENT DOCUMENTS

| CN | 101496036 A | 7/2009 |
| EP | 1724692 A2 | 11/2006 |

(Continued)

OTHER PUBLICATIONS

How, Yijue, and Min-Yen Kan. "Optimizing predictive text entry for short message service on mobile phones." Proceedings of HCII. vol. 5. 2005.*

(Continued)

*Primary Examiner* — Jialong He
(74) *Attorney, Agent, or Firm* — Tom Wong; Micky Minhas

(57) ABSTRACT

Systems comprising a user interface configured to receive text input by a user and a text prediction engine configured to receive the input text and generate text predictions. The text prediction engine may comprise a general language model and a context-specific language model. The text prediction engine is configured to generate text predictions from the general language model and the context-specific language model and combine the text predictions. The text prediction engine may comprise first and second language models and a first context-specific weighting factor associated with the first language model. The text prediction engine is configured to generate text predictions using the first and second language models, generate weighted probabilities of the text predictions from the first language model using the first context-specific weighting factor; and generate final text predictions from the weighted predictions generated from the first language model and the predictions generated by the second language model.

26 Claims, 17 Drawing Sheets

(51) Int. Cl.
*G06F 17/27* (2006.01)
*G06F 3/023* (2006.01)
*G10L 15/183* (2013.01)

(56) References Cited

U.S. PATENT DOCUMENTS

| | | | |
|---|---|---|---|
| 5,612,690 A | 3/1997 | Levy | |
| 5,671,426 A | 9/1997 | Armstrong, III | |
| 5,680,511 A | 10/1997 | Baker et al. | |
| 5,768,603 A | 6/1998 | Brown et al. | |
| 5,805,832 A | 9/1998 | Brown et al. | |
| 5,805,911 A | 9/1998 | Miller | |
| 5,806,021 A | 9/1998 | Chen et al. | |
| 5,896,321 A | 4/1999 | Miller et al. | |
| 5,952,942 A * | 9/1999 | Balakrishnan | G06F 3/0237 341/20 |
| 5,963,671 A | 10/1999 | Comerford et al. | |
| 6,009,444 A | 12/1999 | Chen | |
| 6,011,554 A | 1/2000 | King et al. | |
| 6,052,657 A | 4/2000 | Yamron et al. | |
| 6,054,941 A | 4/2000 | Chen | |
| 6,104,989 A | 8/2000 | Kanevsky et al. | |
| 6,125,342 A | 9/2000 | Selesky | |
| 6,167,377 A * | 12/2000 | Gillick | G10L 15/063 704/240 |
| 6,182,027 B1 | 1/2001 | Nasukawa et al. | |
| 6,204,848 B1 | 3/2001 | Nowlan et al. | |
| 6,219,632 B1 | 4/2001 | Schumacher et al. | |
| 6,236,958 B1 | 5/2001 | Lange et al. | |
| 6,253,169 B1 | 6/2001 | Apte et al. | |
| 6,275,792 B1 | 8/2001 | Lewis | |
| 6,286,064 B1 | 9/2001 | King et al. | |
| 6,307,548 B1 | 10/2001 | Flinchem et al. | |
| 6,307,549 B1 | 10/2001 | King et al. | |
| 6,321,192 B1 | 11/2001 | Houchin et al. | |
| 6,327,561 B1 | 12/2001 | Smith et al. | |
| 6,362,752 B1 | 3/2002 | Guo et al. | |
| 6,377,965 B1 | 4/2002 | Hachamovitch et al. | |
| 6,393,399 B1 | 5/2002 | Even | |
| 6,405,060 B1 | 6/2002 | Schroeder et al. | |
| 6,460,015 B1 | 10/2002 | Hetherington et al. | |
| 6,484,136 B1 | 11/2002 | Kanevsky et al. | |
| 6,490,549 B1 | 12/2002 | Ulicny et al. | |
| 6,519,557 B1 | 2/2003 | Emens et al. | |
| 6,573,844 B1 * | 6/2003 | Venolia | G06F 3/04886 341/22 |
| 6,625,600 B2 | 9/2003 | Lyudovyk et al. | |
| 6,671,670 B2 | 12/2003 | Levin et al. | |
| 6,724,936 B1 | 4/2004 | Riemer | |
| 6,778,958 B1 * | 8/2004 | Nishimura | G10L 15/18 704/235 |
| 6,813,616 B2 | 11/2004 | Simpson et al. | |
| 6,901,364 B2 * | 5/2005 | Nguyen | G10L 15/30 704/1 |
| 6,911,608 B2 | 6/2005 | Levy | |
| 6,917,910 B2 | 7/2005 | Itoh et al. | |
| 6,925,433 B2 | 8/2005 | Stensmo | |
| 6,963,831 B1 | 11/2005 | Epstein | |
| 6,965,856 B1 | 11/2005 | Stuermer | |
| 6,993,476 B1 | 1/2006 | Dutta et al. | |
| 7,075,520 B2 | 7/2006 | Williams | |
| 7,092,870 B1 | 8/2006 | Chen et al. | |
| 7,098,896 B2 | 8/2006 | Kushler et al. | |
| 7,129,932 B1 | 10/2006 | Klarlund et al. | |
| 7,175,438 B2 | 2/2007 | Levy | |
| 7,187,365 B2 | 3/2007 | Harman | |
| 7,218,249 B2 | 5/2007 | Chadha | |
| 7,222,067 B2 | 5/2007 | Glushnev et al. | |
| 7,251,367 B2 | 7/2007 | Zhai | |
| 7,269,546 B2 | 9/2007 | Stensmo | |
| 7,366,666 B2 | 4/2008 | Balchandran et al. | |
| 7,395,081 B2 | 7/2008 | Bonnelykke et al. | |
| 7,426,505 B2 | 9/2008 | Simpson et al. | |
| 7,453,439 B1 | 11/2008 | Kushler et al. | |
| 7,475,010 B2 | 1/2009 | Chao | |
| 7,487,461 B2 | 2/2009 | Zhai et al. | |
| 7,562,016 B2 | 7/2009 | Balchandran et al. | |
| 7,580,829 B2 | 8/2009 | James et al. | |
| 7,610,189 B2 | 10/2009 | MacKie | |
| 7,610,191 B2 | 10/2009 | Gao et al. | |
| 7,706,616 B2 | 4/2010 | Kristensson et al. | |
| 7,720,682 B2 | 5/2010 | Stephanick | |
| 7,750,891 B2 | 7/2010 | Stephanick et al. | |
| 7,809,575 B2 | 10/2010 | Ativanichayaphong et al. | |
| 7,814,088 B2 | 10/2010 | Simpson et al. | |
| 7,843,427 B2 | 11/2010 | Ording et al. | |
| 7,912,700 B2 * | 3/2011 | Bower | G06F 3/0237 704/1 |
| 7,920,132 B2 | 4/2011 | Longe et al. | |
| 7,953,692 B2 | 5/2011 | Bower et al. | |
| 7,996,211 B2 | 8/2011 | Gao et al. | |
| 8,010,343 B2 | 8/2011 | Agapi et al. | |
| 8,032,358 B2 | 10/2011 | Helletzgruber et al. | |
| 8,036,878 B2 | 10/2011 | Assadollahi | |
| 8,073,698 B2 | 12/2011 | Ativanichayaphong et al. | |
| 8,074,172 B2 | 12/2011 | Kocienda et al. | |
| 8,117,144 B2 | 2/2012 | Angell et al. | |
| 8,136,050 B2 | 3/2012 | Sacher et al. | |
| 8,200,487 B2 | 6/2012 | Peters et al. | |
| 8,225,203 B2 | 7/2012 | Unruh | |
| 8,232,973 B2 | 7/2012 | Kocienda et al. | |
| 8,289,283 B2 | 10/2012 | Kida et al. | |
| 8,299,943 B2 | 10/2012 | Longe | |
| 8,516,367 B2 | 8/2013 | Archer | |
| 8,605,039 B2 | 12/2013 | Danielsson et al. | |
| 8,713,432 B2 | 4/2014 | Assadollahi | |
| 8,756,527 B2 | 6/2014 | Paasovaara | |
| 8,812,972 B2 | 8/2014 | Bangalore | |
| 2002/0045463 A1 | 4/2002 | Chen et al. | |
| 2002/0077808 A1 | 6/2002 | Liu et al. | |
| 2002/0091520 A1 | 7/2002 | Endo et al. | |
| 2002/0111806 A1 * | 8/2002 | Franz | G10L 15/18 704/255 |
| 2002/0126097 A1 | 9/2002 | Savolainen | |
| 2002/0156627 A1 * | 10/2002 | Itoh | G10L 15/187 704/254 |
| 2002/0188448 A1 | 12/2002 | Goodman et al. | |
| 2002/0196163 A1 | 12/2002 | Bradford et al. | |
| 2003/0011574 A1 | 1/2003 | Goodman | |
| 2003/0023420 A1 | 1/2003 | Goodman | |
| 2003/0046073 A1 | 3/2003 | Mori et al. | |
| 2003/0073451 A1 | 4/2003 | Kraft | |
| 2003/0093263 A1 | 5/2003 | Chen et al. | |
| 2003/0182279 A1 | 9/2003 | Willows | |
| 2003/0234821 A1 | 12/2003 | Pugliese | |
| 2004/0083198 A1 | 4/2004 | Bradford et al. | |
| 2004/0136564 A1 | 7/2004 | Roeber et al. | |
| 2004/0153975 A1 | 8/2004 | Williams et al. | |
| 2004/0201607 A1 | 10/2004 | Mulvey et al. | |
| 2004/0243393 A1 | 12/2004 | Wang | |
| 2005/0044495 A1 | 2/2005 | Lee et al. | |
| 2005/0060138 A1 | 3/2005 | Wang et al. | |
| 2005/0114770 A1 | 5/2005 | Sacher et al. | |
| 2005/0162395 A1 | 7/2005 | Unruh | |
| 2005/0190970 A1 | 9/2005 | Griffin | |
| 2005/0283724 A1 | 12/2005 | Griffin | |
| 2006/0036428 A1 | 2/2006 | Ramsey | |
| 2006/0047498 A1 | 3/2006 | Fux et al. | |
| 2006/0142997 A1 | 6/2006 | Jakobsen et al. | |
| 2006/0206313 A1 | 9/2006 | Xu et al. | |
| 2006/0247915 A1 | 11/2006 | Bradford et al. | |
| 2006/0265208 A1 | 11/2006 | Assadollahi | |
| 2006/0265648 A1 | 11/2006 | Rainisto et al. | |
| 2006/0274051 A1 | 12/2006 | Longe et al. | |
| 2006/0290535 A1 | 12/2006 | Thiesson et al. | |
| 2007/0016572 A1 | 1/2007 | Bates et al. | |
| 2007/0033002 A1 | 2/2007 | Dymetman et al. | |
| 2007/0046641 A1 | 3/2007 | Lim | |
| 2007/0061753 A1 | 3/2007 | Ng et al. | |
| 2007/0074131 A1 | 3/2007 | Assadollahi | |
| 2007/0076862 A1 | 4/2007 | Chatterjee et al. | |
| 2007/0094024 A1 | 4/2007 | Kristensson et al. | |
| 2007/0157122 A1 | 7/2007 | Williams | |
| 2008/0040099 A1 * | 2/2008 | Wu et al. | 704/9 |

(56) References Cited

U.S. PATENT DOCUMENTS

| | | |
|---|---|---|
| 2008/0076472 A1 | 3/2008 | Hyatt |
| 2008/0077406 A1 | 3/2008 | Ganong |
| 2008/0091412 A1* | 4/2008 | Strope .................... G10L 15/26 704/10 |
| 2008/0126075 A1 | 5/2008 | Thorn |
| 2008/0162113 A1 | 7/2008 | Dargan |
| 2008/0189605 A1 | 8/2008 | Kay et al. |
| 2008/0195374 A1 | 8/2008 | Holubar et al. |
| 2008/0195571 A1 | 8/2008 | Furuuchi et al. |
| 2008/0281583 A1 | 11/2008 | Slothouber et al. |
| 2008/0282154 A1 | 11/2008 | Nurmi |
| 2008/0285857 A1 | 11/2008 | Sharan et al. |
| 2008/0294982 A1 | 11/2008 | Leung et al. |
| 2008/0310723 A1 | 12/2008 | Manu et al. |
| 2008/0312910 A1 | 12/2008 | Zhang |
| 2009/0006101 A1 | 1/2009 | Rigazio et al. |
| 2009/0009367 A1 | 1/2009 | Hirshberg |
| 2009/0019002 A1 | 1/2009 | Boulis |
| 2009/0058690 A1 | 3/2009 | Scott |
| 2009/0106695 A1 | 4/2009 | Perry et al. |
| 2009/0193334 A1 | 7/2009 | Assadollahi |
| 2009/0210214 A1 | 8/2009 | Qian et al. |
| 2009/0249198 A1 | 10/2009 | Davis et al. |
| 2009/0271195 A1 | 10/2009 | Kitade et al. |
| 2009/0284471 A1 | 11/2009 | Longe et al. |
| 2009/0313572 A1 | 12/2009 | Paek et al. |
| 2010/0017393 A1 | 1/2010 | Broicher et al. |
| 2010/0106740 A1 | 4/2010 | Kawauchi |
| 2010/0121870 A1 | 5/2010 | Unruh et al. |
| 2010/0161318 A1 | 6/2010 | Lowles et al. |
| 2010/0171700 A1 | 7/2010 | Sharan et al. |
| 2010/0218141 A1 | 8/2010 | Xu et al. |
| 2010/0283736 A1 | 11/2010 | Akabane et al. |
| 2011/0029862 A1 | 2/2011 | Scott et al. |
| 2011/0047456 A1 | 2/2011 | Sharan et al. |
| 2011/0074685 A1 | 3/2011 | Causey et al. |
| 2011/0179032 A1 | 7/2011 | Ceusters et al. |
| 2011/0202836 A1 | 8/2011 | Badger et al. |
| 2012/0010875 A1 | 1/2012 | Helletzgruber et al. |
| 2012/0167009 A1 | 6/2012 | Davidson et al. |
| 2012/0296650 A1* | 11/2012 | Bates et al. ................ 704/246 |
| 2015/0186362 A1* | 7/2015 | Li et al. ...................... 704/9 |

FOREIGN PATENT DOCUMENTS

| | | |
|---|---|---|
| EP | 2088536 A | 8/2009 |
| GB | 200622248 A | 8/2006 |
| WO | WO 2008/116843 A2 | 10/2008 |
| WO | WO 2008/120033 A1 | 10/2008 |
| WO | WO 2014/150104 A1 | 9/2014 |

OTHER PUBLICATIONS

Silfverberg, Miika, I. Scott MacKenzie, and Panu Korhonen. "Predicting text entry speed on mobile phones." Proceedings of the SIGCHI conference on Human Factors in Computing Systems. ACM, 2000.* van den Bosch, Antal, and Toine Bogers. "Efficient context-sensitive word completion for mobile devices." Proceedings of the 10th international conference on Human computer interaction with mobile devices and services. ACM, 2008.*

Federico; "Efficient Language Model Adaptation Through MDI Estimation"; Proc. of Eurospeech; 1999; p. 1-4.

Frederico; "Bayesian Estimation Methods for N-Gram Language Model Adaptation"; ICSLP; 1996; p. 1-4.

Bellegarda; "Statistical Language Model Adaptation: Review and Perspectives"; Speech Communication 42(1); 2004; p. 93-108.

Florian et al.; Dynamic nonlocal language modeling via hierarchical topic-based Adaption; ACL 1999; 9 pages.

* cited by examiner

Input:

1. [(I→1.0)]
2. [(l→0.5), (`l→0.5)]
3. [(l→0.2)]

Output:

[ID:2 (I'll)→0.1]
[ID:4 (Ill)→0.1]

23 = Typing Pane
24, 26 = Side Pane
25 = Prediction Pane

27 = Typing Pane
29 = Single Pane
38 = Actual Character Entry Button
48 = Most Likely Word Button
58 = Alternative Word Button

SYSTEM AND METHOD FOR INPUTTING TEXT INTO ELECTRONIC DEVICES

CROSS REFERENCE TO RELATED APPLICATIONS

This application is a continuation in part of U.S. patent application Ser. No. 13/262,190, filed Sep. 29, 2011, which is a National Stage of International Application No. PCT/GB2010/000622, filed Mar. 30, 2010, which claims priority to GB Patent Application No. 0905457.8, filed Mar. 30, 2009, the disclosures of which are incorporated herein by reference in their entirety; and is a continuation in part of U.S. patent application Ser. No. 13/501,087, filed Apr. 9, 2012, which is a National Stage of International Application No. PCT/GB2010/001898, filed Oct. 11, 2010, which claims priority to GB Patent Application No. 0917753.6, filed Oct. 9, 2009, the disclosures of which are incorporated herein by reference in their entirety.

TECHNICAL FIELD

The present disclosure relates generally to a system and method for inputting text into electronic devices. In particular the disclosure relates to a system for generating text predictions for display and user selection and a method for doing so.

BACKGROUND

There currently exists a wide range of text input techniques for use with electronic devices. QWERTY-style keyboards are the de facto standard for text input on desktop and laptop computers. The QWERTY layout was designed for two-handed, multi-digit typing on typewriters in 1878 and has been in wide use ever since. It has proven highly effective given a measure of training and/or experience. Reduced-size QWERTY-style keyboards are also used for text entry on mobile devices, such as PDAs and some mobile phones. These keyboards are generally operated using both thumbs, and their advantage lies in the fact that users are almost always familiar with the QWERTY layout. Devices such as the BLACKBERRY BOLD and the NOKIA N810 utilise this model.

Text input for mobile phones, however, has focused primarily on methods of entering alphabetic characters using a 9-digit keypad, where each key usually represents either three or four characters. There are various techniques employed to reduce the number of keystrokes required.

Handwriting recognition has been widely used in the PDA market where input is mostly stylus-based. While it has some advantages for users raised on paper-based handwriting, the use of this technology has declined in recent years because it is relatively slow in comparison with most keyboard-based methods. Speech recognition text input systems also exist for both standard and mobile computational devices. These have not been widely adopted due to limitations in accuracy and the adverse effects of noisy environments.

Touch-screen devices offer a highly flexible platform for different styles of text input, and there are many different models currently available. Traditional QWERTY-style 'soft' keyboards are implemented on devices such as the APPLE IPHONE and many touch-screen PDAs running WINDOWS MOBILE. Other devices such as the BLACKBERRY STORM use multi-character soft keyboards with various methods of disambiguation and completion. There are also many third-party systems that offer alternative methods of text entry for touch-screen devices. Examples include SHAPEWRITER (ShapeWriter Inc.) which is based on recognition of the shapes created by sliding between letters on a QWERTY-style background, and ExIdeas' MESSAGEEASE which utilises an optimised keyboard layout for stylus and finger-based entry.

A somewhat different model of text entry is offered by the University of Cambridge's 'Dasher' system, in which text input is driven by natural, continuous pointing gestures rather than keystrokes. It relies heavily on advanced language model-based character prediction, and is aimed primarily at improving accessibility for handicapped users, although it can also be used in mobile and speech recognition-based applications.

Many of the input models discussed above utilise some form of text prediction technology. Known prediction models for enhancing text input have two main functions:

1) Disambiguation of multiple-character keystrokes.
2) Offering potential completions for partially-entered sequences.

Examples of such technologies include Tegic Communications"T9", Motorola's 'ITAP', Nuance's 'XT9', Blackberry's 'SURETYPE' and Zi Technology's 'EZITYPE' and 'EZITEXT'. In each case a dictionary of allowable terms is maintained and, given a particular input sequence, the system chooses a legitimate term (or set of terms) from the dictionary and presents it to the user as a potential completion candidate. T9 requires the user to enter a number of characters equal to the length of the target input sequence, and thus only offers function 1) above, whereas the other systems offer both 1) and 2).

In all of these technologies, the basic dictionary can be augmented with new terms entered by the user. This is limited only by the amount of device memory available. T9 uses a static dictionary, meaning that words sharing the same key sequence are always suggested to the user in the same order. In contrast, Motorola's ITAP utilises a dynamic dictionary, meaning that the first word predicted for a given key sequence may not remain the same each time the key sequence is entered. Rather, completions are suggested in order of most recent use. However, this method does not keep track of which completion is the most probable; it merely chooses the one used most recently.

Blackberry's SURETYPE, Nuance's XT9 and Zi Technology's EZITYPE offer somewhat more sophisticated models, in which candidate completions are ordered on the basis of usage frequency statistics. In addition, Zi Technology's EZITEXT also has the ability to predict multi-word completion candidates given appropriate input, by scanning a user's previous input to identify high frequency phrases.

The present disclosure represents a fundamental shift away from predominantly character-based text input.

SUMMARY

In accordance with the present disclosure there is provided a system comprising a user interface configured to receive text input by a user, a text prediction engine comprising a plurality of language models and configured to receive the input text from the user interface and to generate concurrently text predictions using the plurality of language models and wherein the text prediction engine is further configured to provide text predictions to the user interface for display and user selection.

The text predictions are generated concurrently from the plurality of language models in real time. The plurality of language models comprises a model of human language and at least one language model specific to an application. The at least one language model specific to an application comprises one or more of an email, SMS text, newswire, academic, blog, or product review specific language model. In an embodiment, the at least one language model specific to an application comprises an email and an SMS text specific language model and the text predictions are generated using one or both of the email and SMS text specific language models. The plurality of language models may also include at least one additional language model, which may be a user community specific language model for example.

In an embodiment of the disclosure, the system includes a mechanism configured to compare a sequence of terms stored in a language model to a sequence of terms stored in one or more other language models and to remove duplicate or multiple entries by retaining only the most probable of the duplicate or multiple entries.

In another embodiment of the disclosure, the plurality of language models includes a user specific language model based on an n-gram language model that is updated to record the frequency of occurrence of n-gram paths input by a user in an n-gram map. The user specific language model is configured, in response to inputted text which is not represented in the user specific language model, to insert new paths into the n-gram map within the language model.

In an embodiment the text prediction engine comprises a mechanism to combine the predictions generated by each language model. The mechanism is configured to insert the predictions into an ordered associative structure or an STL 'multimap' structure and return the p most probable terms as the predictions for provision to the user interface.

The plurality of language models utilise a beginning-of-sequence marker to determine word or phrase predictions in the absence of any preceding text input and/or after end-of-sentence punctuation and/or after new line entry.

In an embodiment of the system of the disclosure, each of the plurality of language models models language using an approximate trie and an n-gram map, wherein the approximate trie is an extension of a standard trie, with a set of values stored at each node for all subsequently allowable character sequences from that node.

In another embodiment of the system of the disclosure, each of the plurality of language models models language using a probabilistic trie and an n-gram map, wherein the probabilistic trie is an extension of a standard trie, with a set of values stored at each node for all subsequently allowable character sequences from that node.

The language model is configured to conduct a search of the n-gram map to determine word or phrase predictions for a next term on the basis of up to n−1 terms of preceding text input. The language model is configured to conduct a search of the approximate trie or the probabilistic trie to ascertain word predictions based on at least one inputted character.

Additionally, where the language model comprises an approximate trie, the language model may include a candidate filter to narrow the predictions determined by the approximate trie, wherein the candidate filter is configured to discard all candidate strings for which the current input is not a substring.

The language model may also include a mechanism to compute the intersection of the predictions determined by the approximate trie and optionally the candidate filter, or the probabilistic trie, and the n-gram map, by searching for and retaining only identifiers that are present in both prediction sets.

In an embodiment, the language model also includes a Bloom filter, comprising an n+1 gram map, which is configured to search the n+1 gram map to return a new prediction set based on a context of 1) the n−1 terms of preceding text input used to search the n-gram map, 2) the prediction terms in the determined intersection, and 3) an extra term of context, immediately preceding the n−1 terms used to search the n-gram map.

In an embodiment, the language model further includes a topic filter which is configured to predict topic categories represented in a current input text, predict topic categories for the terms in the prediction set and adjust the probability of the predictions in the prediction set based on the category and topic predictions.

The present disclosure also provides a touch-screen interface that includes a single or multi-character entry mechanism, a word prediction pane, and a typing pane to display inputted text. The interface includes a menu button which toggles the screen between prediction, numbers and punctuation, and further punctuation screens. The interface includes a send button to send the inputted text to an email application. The user interface is configured for word or phrase input, dependent on which term is chosen for input in a given sequence of words.

The word prediction pane includes one or more word keys to present predicted words and wherein, in response to a word key press, the user interface is configured to display the word in the typing pane. The interface further comprises a delete button and/or an undo button, wherein in response to a press of the undo button or a left-to-right gesture on the delete button, the interface is configured to undo the previous word selection, by erasing the word from the typing pane and returning to the previous prediction pane.

The word prediction pane includes one or more word keys to present predicted words and wherein, in response to a word key press, the user interface is configured to display the word in the typing pane and pass the current input sequence including that word to the text prediction engine as a context input. In response to a word key press and hold or left-to-right gesture on the word key, the user interface is configured to display the word in the typing pane, pass the current input sequence excluding that word to the text prediction engine as a context input, and pass the characters of that word to the text prediction engine as a current word input. The interface further comprises one or more punctuation keys to present punctuation marks and a return key and wherein, in response to an end-of-sequence punctuation or 'return' key press, the user interface is configured to pass the current sequence to the text prediction engine, wherein the text prediction engine comprises a mechanism configured to tokenise the current sequence and pass the tokenised sequence to the user specific language model, and wherein the user specific language model is configured to assign numerical identifiers to the tokenised sequence and update its n-gram map.

In accordance with the present disclosure, there is also provided a method for processing user text input and generating text predictions for user selection. The method includes the steps of receiving text input into a user interface, generating concurrently, using a text prediction engine comprising a plurality of language models, text predictions from the multiple language models, and providing text predictions to the user interface for user selection.

In an embodiment, each of the plurality of language models includes an n-gram map and an approximate trie or a probabilistic trie and the method includes the step of conducting a search of the n-gram map to determine word or phrase predictions for a next term on the basis of up to n−1 terms of preceding text input.

In an embodiment, each of the plurality of language models comprises an n-gram map and an approximate trie or a probabilistic trie and the method includes the step of conducting a search of the approximate trie or the probabilistic trie to ascertain word predictions based on at least one inputted character. Where each of the plurality of language models comprises an approximate trie, the language models also comprising a candidate filter, the method further comprising narrowing the word predictions determined by the approximate trie by discarding all candidate strings for which the current input is not a substring.

The language model comprises a mechanism to compute the intersection of the predictions determined by the approximate trie and optionally the candidate filter, or the probabilistic trie, and the n-gram map and the method includes the further step of computing the intersection of the predictions. The mechanism searches for and retains only identifiers that are present in both prediction sets.

In an embodiment, the language model comprises a Bloom filter which comprises an n+1 gram map and the method includes the additional step of returning a new prediction set based on a context of 1) the n−1 terms of preceding input text used to search the n-gram map, 2) the prediction terms in the determined intersection, and 3) and extra term of context, immediately preceding the n−1 terms used to search the n-gram map.

In an embodiment, the language model further comprises a topic filter and the method includes the further steps of predicting topic categories represented in a current input text, predicting topic categories for the terms in the prediction set and adjusting the probabilities of the predictions in the prediction set based on the topic category predictions.

In an embodiment, the plurality of language models includes a user specific language model based on an n-gram language model and the method includes the further step of updating the frequency of occurrence of n-gram paths, input by a user, in an n-gram map. In response to the input of text which is not represented in the language model, the method includes the step of inserting new paths in the n-gram language model.

The text prediction engine comprises a mechanism to combine the predictions generated from each language model and the method includes the further step of combining the predictions, which combination includes inserting the predictions into an ordered associative structure or an STL 'multimap' structure, and returning the p most probable terms for provision to the user interface.

There is also provided, in accordance with the disclosure a computer program product including a computer readable medium having stored thereon computer program means for causing a processor to carry out the method of the disclosure.

The predictive text input system and method of the present disclosure has significant advantages over current technologies. While T9, iTap, SureType etc. are based on term dictionaries, the present system is based on adaptive probabilistic language model technology, which takes into account multiple contextual terms and combines information from multiple language domains in a mathematically well-founded and computationally efficient manner. The present text input system therefore provides a technical improvement that reduces the user labour aspect of text input.

BRIEF DESCRIPTION OF THE DRAWINGS

The present disclosure will now be described in detail with reference to the accompanying drawings, in which.

DETAILED DESCRIPTION OF ILLUSTRATIVE EMBODIMENTS

Figure 1:
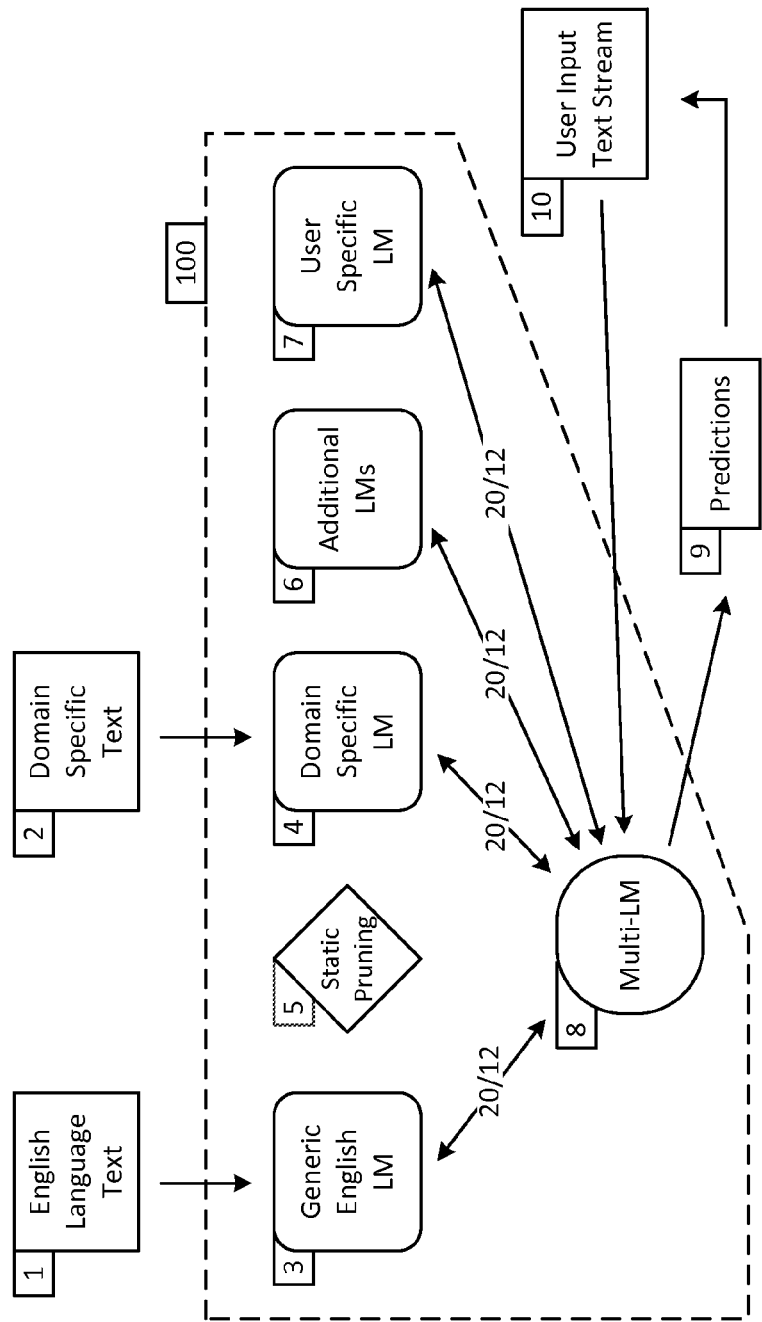
FIG. 1 is a schematic of a high level prediction architecture according to the disclosure.

In general, but not exclusive terms, the system of the disclosure can be implemented as shown in FIG. 1. FIG. 1 is a block diagram of a high level text prediction architecture according to the disclosure. The system of the present disclosure comprises a text prediction engine 100 which generates concurrently text predictions 20 from multiple language models. In one embodiment, the system comprises a model 3 of a human language, in this embodiment the English language, and at least one language model 4 specific to an application, although in other embodiments only one of these need be present. In other embodiments, the human language model is of a language other than English. The language models are generated from language texts. Therefore, the model 3 of the English language is generated from English language text 1. The English language text 1 would usually, but need not, constitute a large corpus of English text, sourced from a wide variety of genres and language demographics. Similarly, an application specific language model 4 is generated from text 2 from that specific application.

By way of example only, if the system is a computer or similar device in which the target application is email, then the application specific language model 4 will be a model generated from email language text 2 comprising a large quantity of email messages from a wide variety of authors. Similarly, in the case of a mobile device, the application specific language model 4 will be generated from mobile SMS text language 2. In some embodiments of the system a plurality of application specific language models 4 are required, for example a mobile device can be used for emailing and SMS text messaging, thus requiring an SMS specific language model and an email specific language model. Another example of a system requiring a plurality of application specific language models 4 is that of a computer which can be used for word processing, emailing and sending SMS messages to mobile devices through the internet, thus requiring three application specific language models 4. Other combinations are, of course, possible, and further examples of application specific language models include language models generated from newswires, blogs, academic papers, word processing and patents.

In some embodiments, the system can further comprise additional language models 6. For instance, it might be efficacious to construct a company-specific language model for use within a particular organisation. This may include organisation specific language enabling prediction of preferred or standard wording, for example, during text input. However, it will be appreciated that the additional language models 6 can comprise any 'user community' specific language model. For example the 'user community' specific language model could comprise a local dialect or interest grouping specific language model.

The language models discussed so far are static language models. That is, they are generated from a representative body of text and thereafter are not changed. Of course, new language models can be created and used, but the existing ones in the system of the disclosure remain unchanged until replaced or removed.

The present system utilises a mechanism 5, static pruning, across all static language models, to reduce the amount of information stored in the system. If duplicate or multiple (in the case of a system comprising three or more language models) entries are detected, the mechanism 5 'prunes' the language models by retaining only the most probable entry. Static pruning is described with reference to a single language model in a later section of the description.

The text prediction engine 100 operates to generate concurrently text predictions 20 from the multiple language models present. It does this by employing a multi-language model 8 (Multi-LM) to combine the predictions 20 sourced from each of the multiple language models to generate final predictions 9 that are provided to a user interface for display and user selection. The final predictions 9 are a set (i.e. a specified number) of the overall most probable predictions. The Multi-LM 8 generates the final predictions 9 by inserting the predictions 20 from each language model into an ordered associative structure which may be an ordered STL 'multimap' structure.

An ordered associative structure is an abstract data type composed of a collection of unique keys and a collection of values, where each key is associated with one value (or set of values). The structure can be used to store a sequence of elements as an ordered tree of nodes, each storing one element. An element consists of a key, for ordering the sequence, and a mapped value. In one ordered associative structure of the present system, a prediction is a string value mapped to a probability value, and the map is ordered on the basis of the probabilities, i.e. the prediction strings are used as keys in the structure and the probability values are used as values in the structure. In the present system, the structure is ordered by the values (rather than by the keys which are the prediction strings). The operation of finding the value associated with a key is called a lookup or indexing.

An STL multimap is a specific type of ordered associative structure in which duplicate keys are allowed. In the STL multimap of the present system, a prediction is a string value mapped to a probability value, and the map is ordered on the basis of the probabilities, i.e. the probability values are used as keys in the multimap and the strings as values. Since, the keys are used to order the structure, the multimap is naturally ordered by the probability values.

By way of example, given the predictions "a"→0.2 and "the"→0.3 from a first language model, and the predictions "an"→0.1 and "these"→0.2 from a second language model, the Multi-LM 8 inserts these predictions into an ordered associative structure or a multimap such that the entries are ordered by their probabilities ((0.1→"an"), (0.2→"a"), (0.2→"these"), (0.3→"the")). This structure/multimap can subsequently be read from the upper value end to obtain a set of final 'most probable' predictions 9.

In an embodiment, the system further comprises a user specific language model 7, which comprises a dynamic language model trained progressively on user input. The user input text stream 10 refers to the evolving text data generated by the user which is then fed back into the dynamic user specific language model as progressive training data. In response to the input of end-of-sentence punctuation or a 'return' character, or at an otherwise predetermined time, the user inputted text sequence is passed to the Multi-LM 8 which splits the text sequence into 'tokens' as described later. The tokenised sequence data 12 is then passed to the user specific language model 7. The updating of a dynamic language model is described in a later section of the description, with reference to the structure of a single language model.

By updating the user specific language model 7, the language model evolves with user input 10, thereby providing a feedback loop in which predictions generated by the user specific language model 7 depend on the selection by the user of previous predictions 9 generated by the text prediction engine or the addition of words initially absent from the system (which are input by character entry).

Thus the present system utilises two types of language models, static and dynamic. The user specific language model 7 is an example of a dynamic language model.

The system of the present disclosure is built around the principle of predictive language model inference, in which the probability of a particular term is estimated given a particular context, P(term|context), for all terms in the language. The probabilities are estimated from data observed in training and through dynamic usage of the system. Here, "context" denotes both the terms that have occurred previously in the sequence, as well as any knowledge the system has about the current term (e.g. it starts with a specific character or characters, or it is indicative of a certain topic). Given a particular context, the system predicts the words that are most likely to follow by using estimates of probabilities, P(term|context).

The text prediction engine has the capability of performing phrase-level prediction. For instance, if it is to predict the next two terms, it requires an estimate for P(term1, term2|context) which can be rearranged as P(term1|term2, context)*P(term2|context). P(term|term2, context) is just P(term1|context2), which is a probability in the format P(term|context), for which it has estimates. P(term2|context) is also in the format P(term|context), for which it has estimates. Therefore, the text prediction engine has the necessary information to perform phrase-level prediction.

Phrase-level prediction significantly increases the upper-bound computational cost, as the predictive text engine must now search in the space of combinations of terms ($O(n^m)$ where m is the length of the phrase), but the present system utilises effective methods of rendering the computational cost manageable.

The system limits the space of combinations of terms (i.e. the space of potential phrase predictions) to a tiny fraction of the full $n^m$, thus reducing the computational costs. To do this, given a predicted term $t_i$, the ith term in a predicted phrase, a following term $t_{i+1}$ is only predicted if the joint probability $P(t_0, t_1 \ldots t_i)$ exceeds the value of the lowest probability in the current prediction set. The joint probability estimate is obtained by multiplying together each of the individual component probabilities, thereby requiring that a high degree of certainty be attained before a phrase prediction is made. Further phrase-level predictions will not be made if the joint probability falls below a threshold value.

The generation of predictions from an individual language model is now described with reference to FIGS. 2A-D, which are block diagrams of alternative language models of the prediction architecture according to the disclosure.

There are two inputs into a given language model, a current term input 11 and a context input 12. The current term input 11 comprises information the system has about the term the system is trying to predict, i.e. the term the user is attempting to enter. This could be a sequence of multi-character keystrokes, individual character keystrokes or a mixture of both. For example, if the user was attempting to enter the term "overt", and had input two keystrokes on a multi-character keyboard, the current term input 11 might be the set {o/p, v/x/z}, indicating that the 2-character-key o/p and the 3-character-key v/x/z had been used.

Figure 2A:
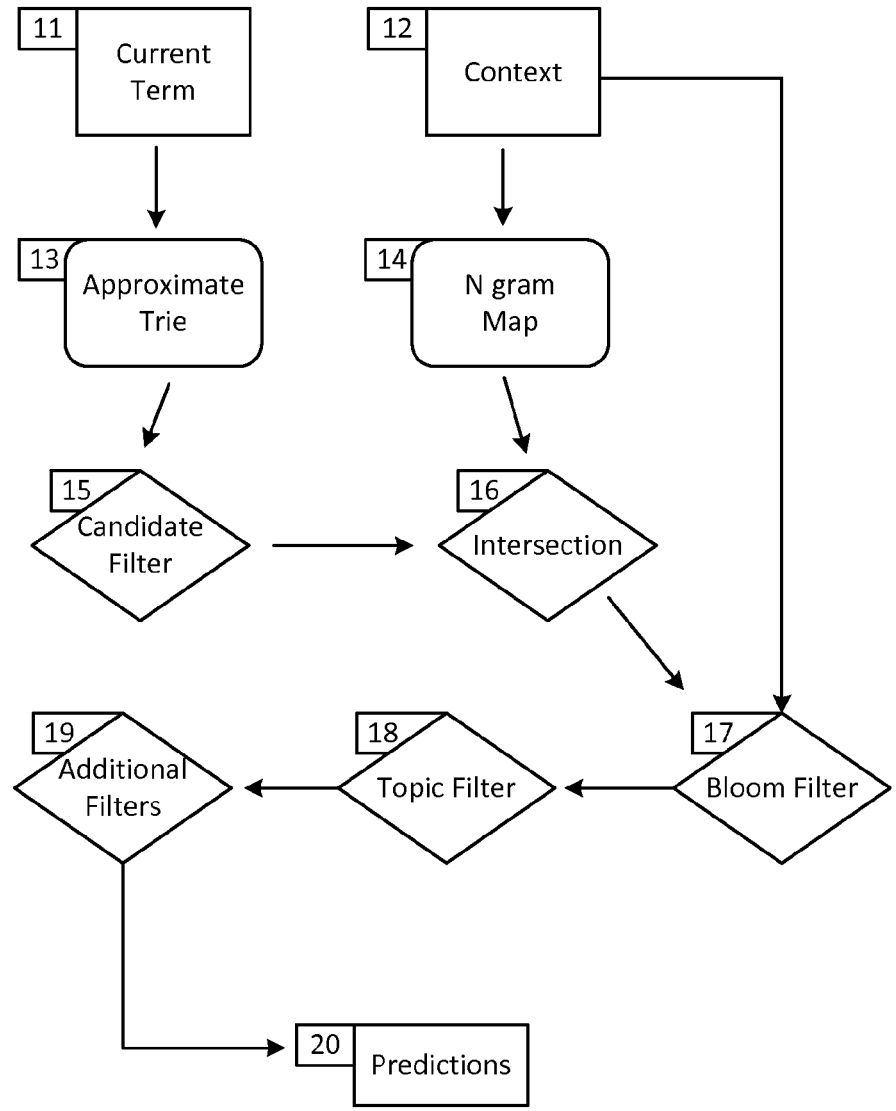
FIGS. 2A, 2B, 2C and 2D are schematics of alternative language models of the prediction architecture according to the disclosure.
Figure 2B:
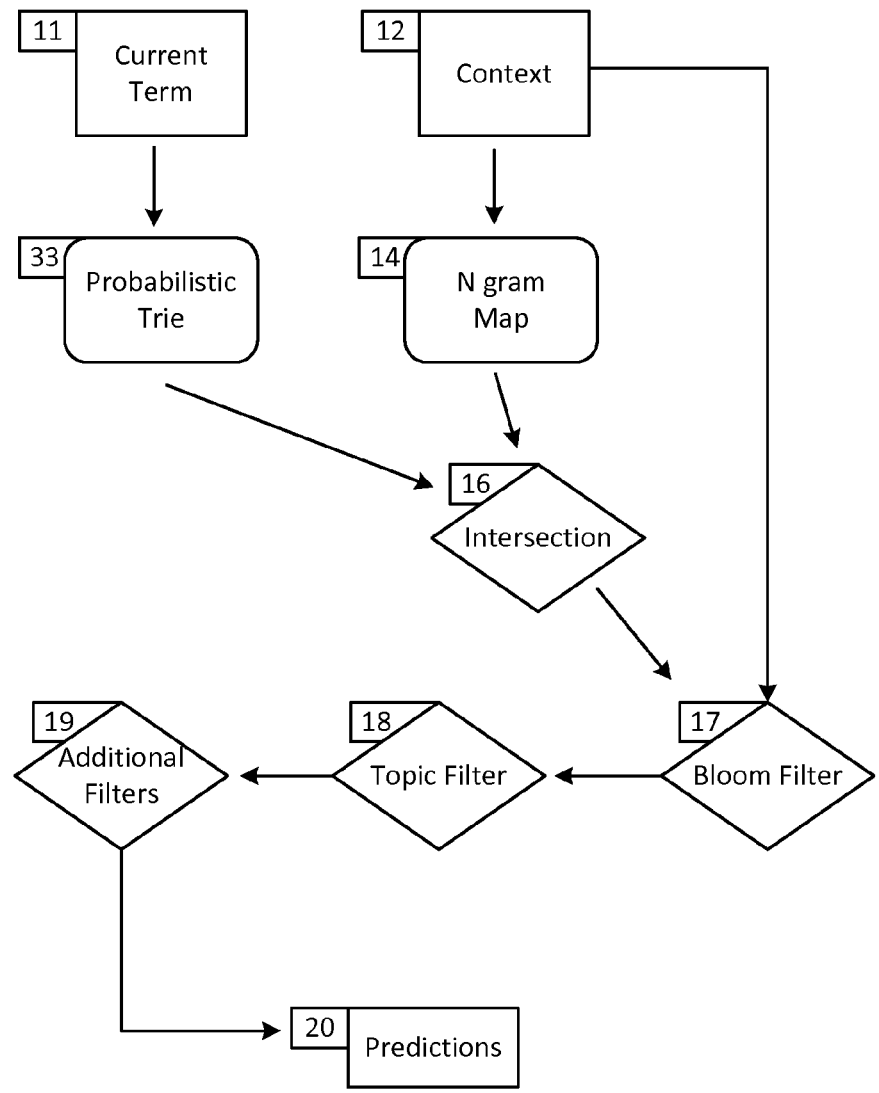
Figure 2C:
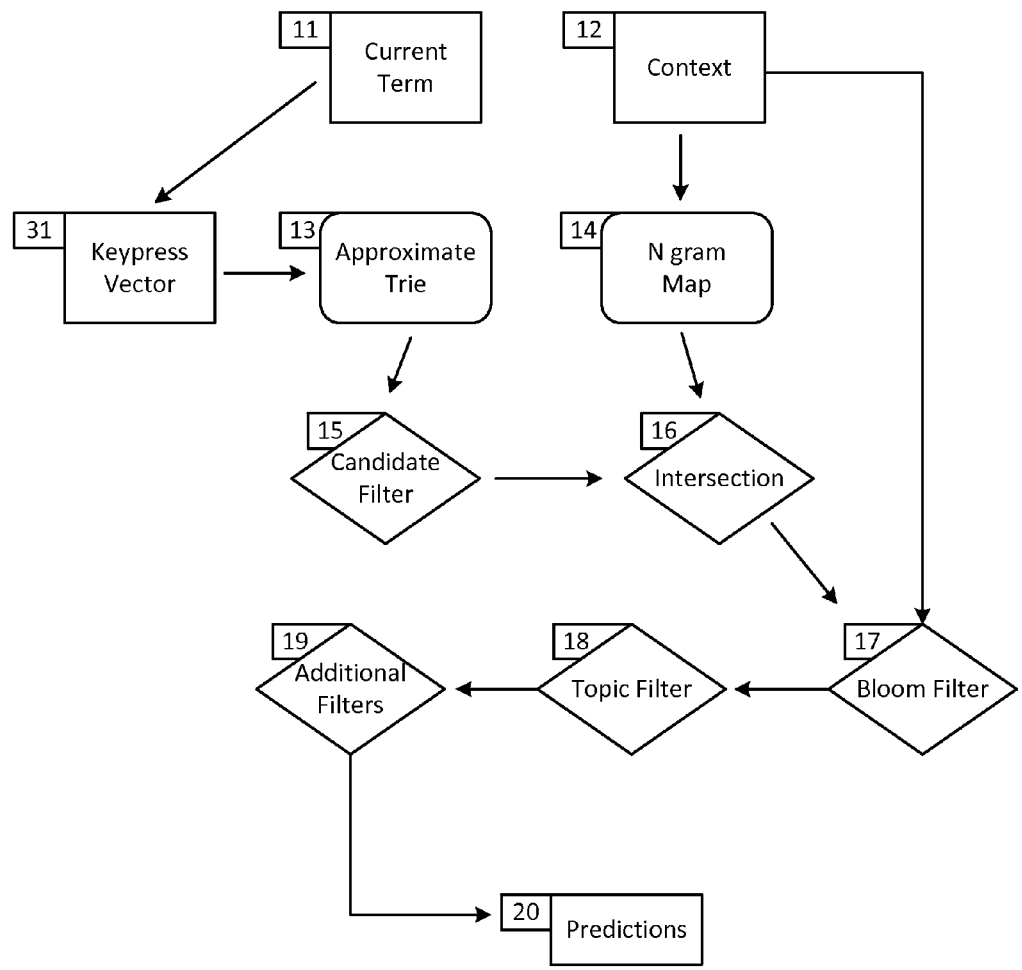
Figure 2D:
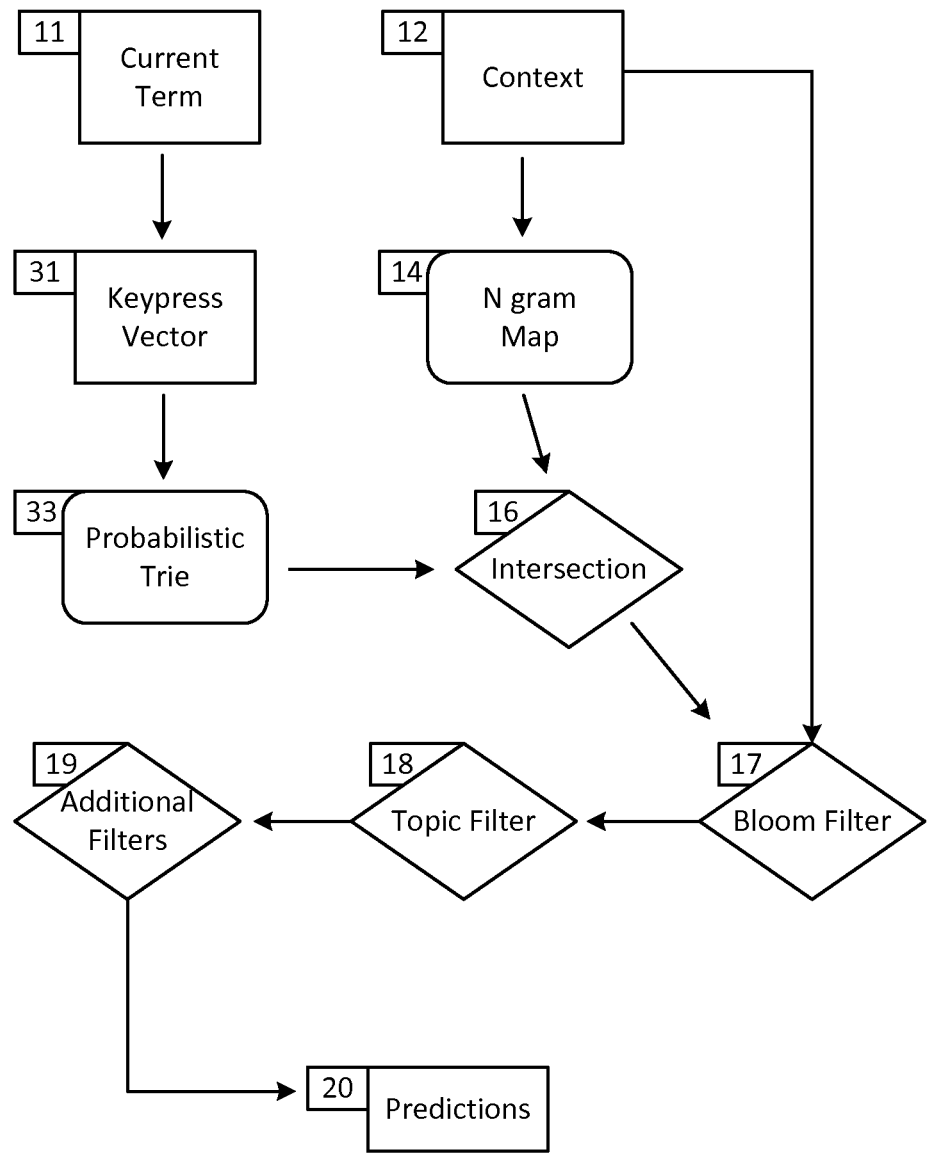

As shown in FIGS. 2C and 2D, the system can be configured to generate a KeyPressVector 31 from the current term input 11. The KeyPressVector takes the form of an indexed series of probability distributions over character sequences. For example, if the user has entered the characters 'i' and 'm', using individual character keystrokes, the KeyPressVector can codify possible alternatives the user might have been intending, e.g.: im, Im or I'm.

The KeyPressVector 31 contains a number of elements equal to the number of keystrokes made by the user, in this example two. An example of a KeyPressVector generated to allow the alternatives shown above might be {[(i→0.7), (I→0.3)], [(m→0.7), ('m→0.3)]}. There are two elements to the KeyPressVector, [(i→0.7), (I→0.3)] and [(m→0.7), ('m→0.3)].

The first element states that the user intended to enter the character 'i' with 0.7 probability, and the character 'I' with 0.3 probability. The second element states that the user intended to enter the character 'm' with 0.7 probability and the character sequence ''m' with 0.3 probability.

As the skilled reader will be aware, the KeyPressVector embodiment is not restricted to individual character keystrokes, and could be used for multi-character keystrokes as well. In the case of multi-character keystrokes, the first element of the KeyPressVector 31 will comprise probability values relating to the multiple characters associated with that keystroke. If the user were to press a key representing the characters g, h and i, the first element of the KeyPressVector will comprise probabilities values associated with g, h and i, and the first element of the KeyPressVector will be [(g→0.33))], [(h→0.33)], [(i→0.33)], as each of the characters sharing the keystroke will have an equal probability.

The probability distributions associated with each keystroke can be generated in a multiplicity of ways. As a non-limiting example, given a standard QWERTY keyboard layout, it can be assumed that if the user enters a particular character, there is some probability that he/she actually meant to press the characters immediately adjacent. By way of a non-limiting example, if the user enters the character 'k', the KeyPressVector might assign a small probability to the characters 'j', 'i', 'l' and 'm' as they are immediately adjacent to VC on the QWERTY keyboard.

Alternatively, probability values might be assigned to characters on the basis of their distance from the point of contact on a touchscreen device. For instance, let's assume that the user touched on the 'h' character key, with the following distances from surrounding key centroids:
1) h: 0.05
2) j: 0.3
3) g: 0.25
4) y: 0.5
5) n: 0.45
6) b: 0.7
7) u: 0.7

The normalised inverse of these distances (i.e. $p=(1/d)/D$, where p is the resultant probability, d is the distance for a particular character, and $D=\Sigma 1/d$, the sum over all inverse distance values) can be used to generate probabilities for the KeyPressVector, e.g.
1) h=20/34.41=0.58
2) j=3.33/34.41=0.1
3) g=4/34.41=0.12
4) y=2/34.41=0.06
5) n=2.22/34.41=0.65
6) b=1.43/34.41=0.04
7) u=1.43/34.41=0.04

More intricate and accurate methods of generating probabilities in the KeyPressVector have the advantage of improving the accuracy of the predictions, but disadvantageously they are usually more costly to compute. Probabilities for character sequences such as 't (which can be used to automatically add an apostrophe before the character 't') must be established a-priori.

Figure 3:
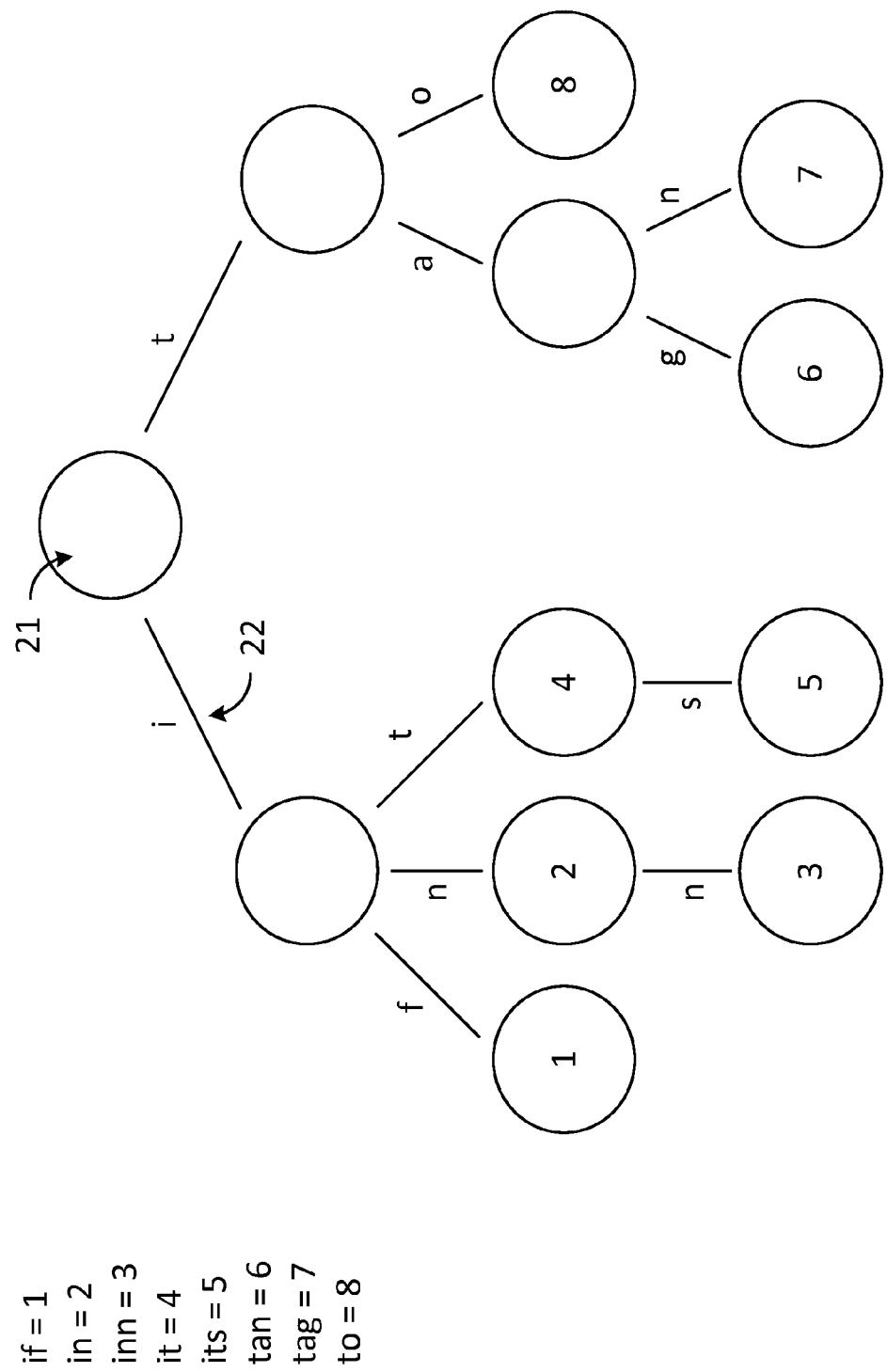
FIG. 3 is a schematic of a standard trie.

Each language model utilises an approximate trie 13 (see FIGS. 2A and 2C) or a probabilistic trie 33 (see FIGS. 2B and 2D) to generate word predictions based on the current term input 11 or the KeyPressVector 31. An approximate trie 13 or a probabilistic trie 33 is an extended version of a standard trie. A standard trie, or prefix tree, as is known in the art, is an ordered tree-like data structure used to store an associative array of character sequences. An example of a standard trie, used to store a small set of text strings, is illustrated in FIG. 3. Each node 21 contains a pointer 22 to subsequent nodes. Terminal nodes (i.e. nodes which end a word) also contain a value associated with the current path. In a trie, as depicted, characters associated with a given node are ordered alphabetically and the nodes are assigned values according to the alphabetical ordering of the paths. The number of paths from each node is upper bounded by the number of characters in the alphabet. Standard tries facilitate rapid retrieval with efficient storage overheads.

Figure 4A:
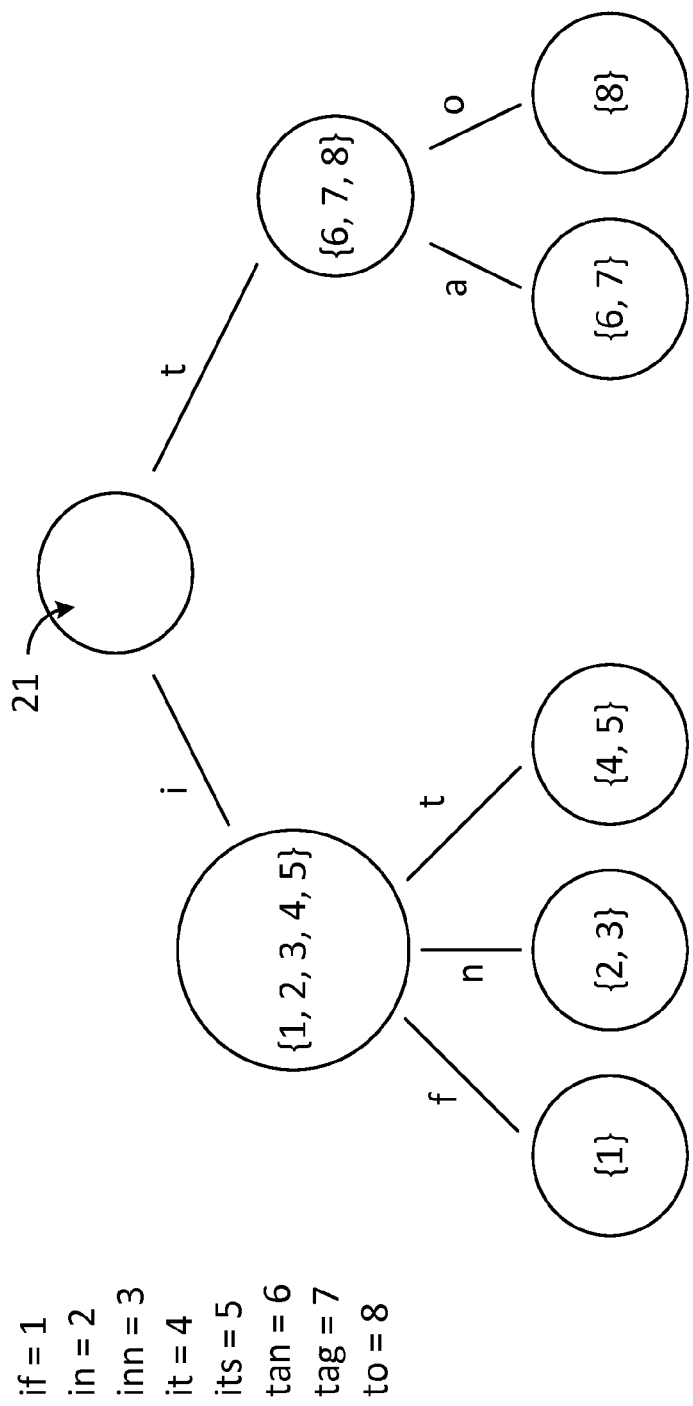
FIG. 4A is a schematic of a compressed approximate trie.

FIG. 4A illustrates an approximate trie 13 according to the disclosure and used to store the same set of text strings as the standard trie of FIG. 3. Instead of storing a single value at each node 21 associated with a path, an approximate trie 13 stores a set of values for all subsequently-allowable sequences. This extension from a standard trie optimises computational efficiency and memory overheads. It enables the text prediction engine to rapidly identify all sequences that could follow from a given prefix. It also allows the text prediction engine to specify a maximum depth for the internal tree and still guarantee that for any given sequence, if a specified character sequence and associated value was added to the trie then the set of returned values when searching for the given sequence will necessarily contain the respective value.

By way of example, the term "investigate", mapped to numerical identifier '9', can be added to an approximate trie of depth 4 in a language model. The language model will initially follow, in the approximate trie, the path to the node represented by the character 'i' and add the identifier '9' to the set of values at that node (because each node stores a set of values for all subsequently-allowable sequences). It will then follow the path to the node represented by 'n' and add '9' to its values, and the same for 'v', and 'e', at which point the maximum depth has been attained and so the procedure terminates. Subsequently, if "investigate" is being searched for by a language model, the language model will conduct a binary search of the approximate trie to follow the path 'i'→'n'→'v'→'e' and then return the set of values at the node representing 'e', which will necessarily contain the value '9'. However, the set of values at the node representing 'e' will also contain values for any other strings that have also been inserted and begin with "inve".

Hence, the language model cannot guarantee that additional sequence values that are not compatible with a specified search sequence will not be returned, when the current term input exceeds the maximum depth of the approximate trie. Hence, the extension from a standard trie is named as an 'approximate trie', because interrogation returns an approximation to the true set of associated values.

Figure 4B:
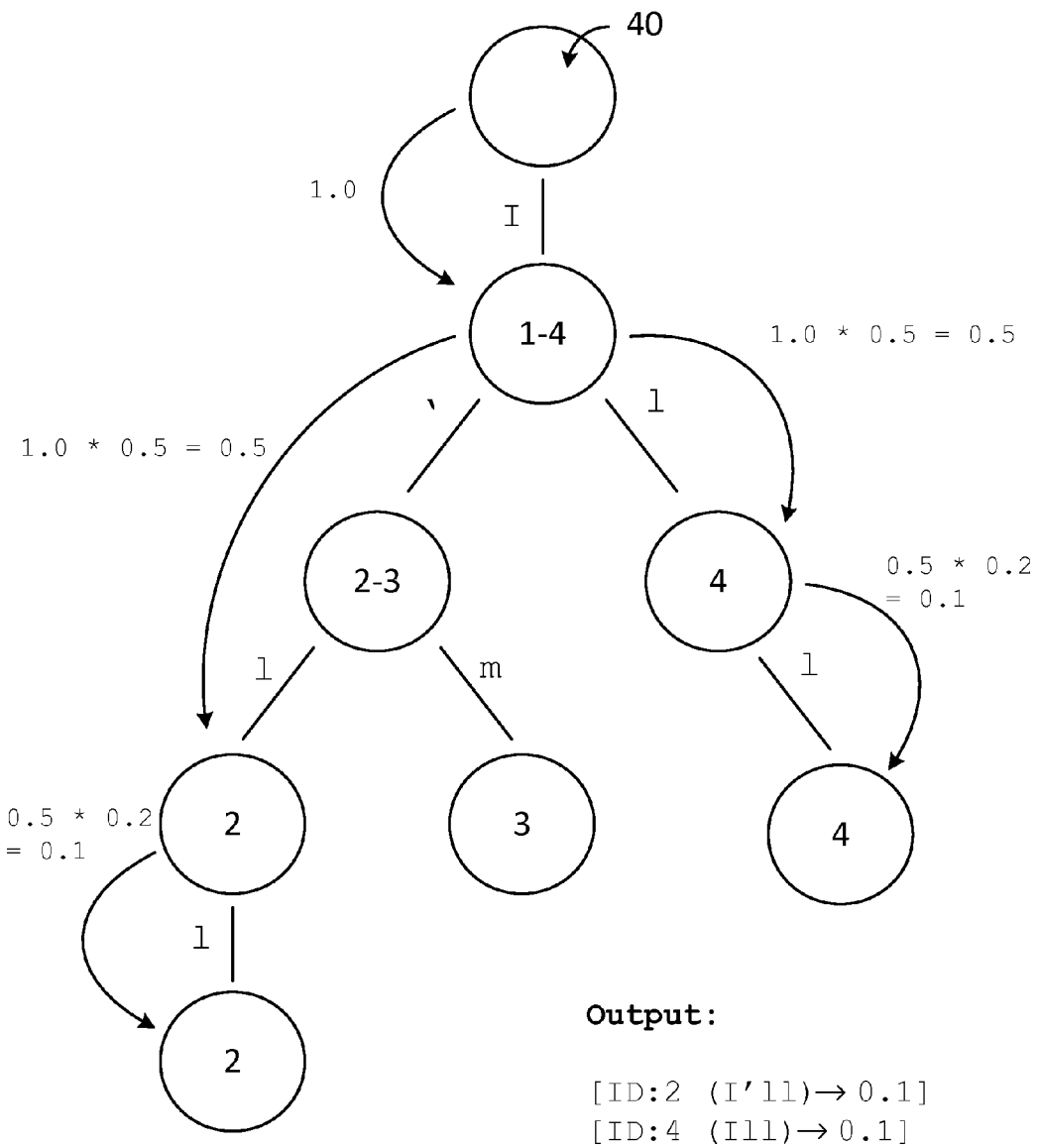
FIG. 4B is a schematic of a probabilistic trie.

An alternative to the approximate trie is shown in FIG. 4B which schematically shows a probabilistic trie 33. In the illustrated example, the probabilistic trie 33 is used to store the following complete term sequences: "I", "Ill", "I'll", "I'm", as well as substrings such as "Il", "I'l" etc. The arrows illustrate how the probabilistic trie is interrogated, given a particular KeyPressVector 31. In FIG. 4A, the KeyPressVector has three elements, corresponding to three keystrokes:

1. [(I→1.0)]
2. [(l→0.5), ('l→0.5)]
3. [(l→0.2)]

Note that for simplicity in this example, the third element of the KeyPressVector consists of a single element with probability 0.2. In practice, each element would consist of a true probability distribution, i.e. summing to 1. Furthermore, for simplicity, this example describes an individual character entry keystoke.

Each arrow in FIG. 4B represents recognition of a sequence within the KeyPressVector (which relates to a character that has been entered by a keystroke), and the interrogation procedure attempts to follow every possible path through the KeyPressVector as it descends through the probabilistic trie. If a match is found, the associated probability value for the sequence is multiplied with the current cumulative probability state, and the process continues. The output from interrogation of the probabilistic trie is a sequence of term identifiers mapped to probability values, each term identifier representing a term for which a single path through the KeyPressVector is a (potentially improper) substring.

In this example, if the probabilistic trie is being interrogated with the KeyPressVector, the system would begin at the root node 40, and attempt to follow the sequence contained in the first item in the first element of the KeyPressVector, which in this case is the character "I". The only path leaving the root node contains the character "I" so the system follows it and updates the probability state to 1.0. Since there are no further items in the first element of the KeyPressVector the system moves to the next element, first attempting to follow the character 'l' and then the sequence "'l". Both options match the structure of the trie, so both paths are followed and the probability state splits into two, with the relevant multiplication performed in each. In both cases the current state is multiplied by 0.5 to yield 0.5. Note that the system has traversed two states within the trie to follow the "'l" path, but this is considered a single probabilistic transaction, as specified by the KeyPressVector because the user did not enter the apostrophe. The system then moves onto the final element in the KeyPressVector and attempts to match the character 'l' from both current states. This is a success, and the relevant probabilistic multiplications are made in both cases, yielding current states of 0.1. As there are no further elements in the KeyPressVector, the system returns the values in the nodes at each end point, along with their respective probability state values, in this case the indentifiers 2 and 4, both mapped to the probability value 0.1.

Figure 4C:
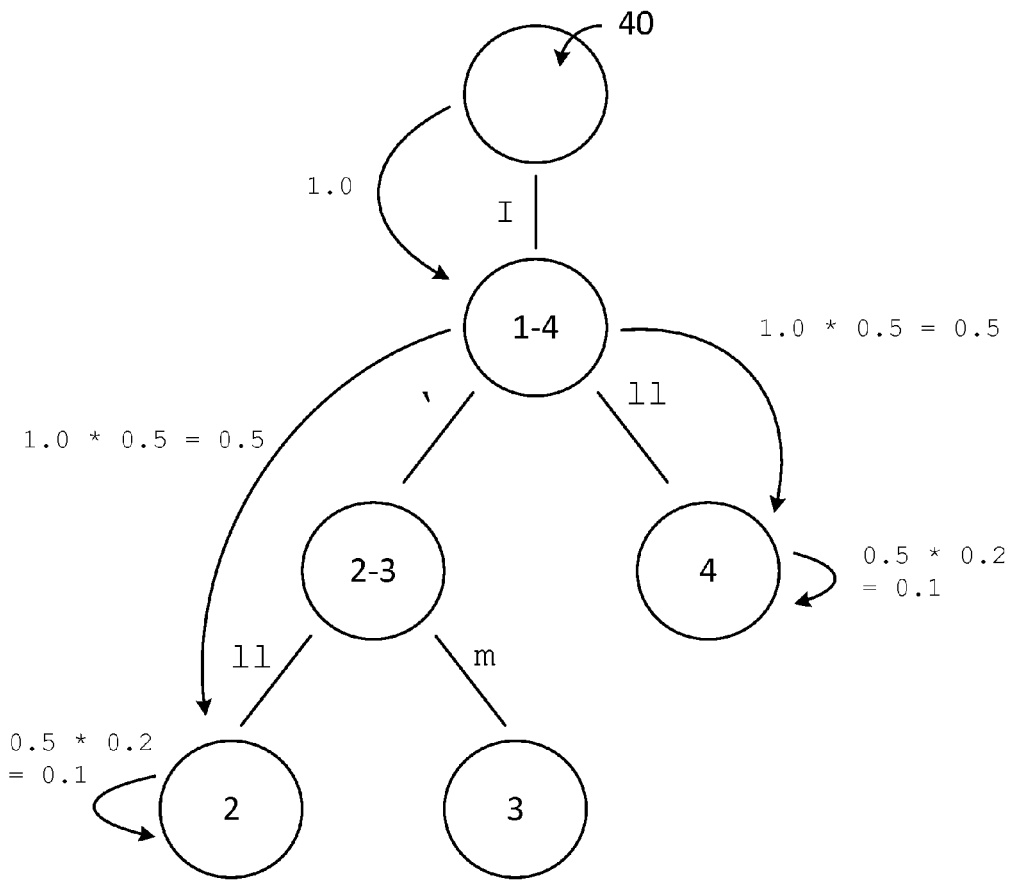
FIG. 4C is a schematic of a compressed probabilistic trie.

To increase memory efficiency the system compresses the full probabilistic trie in a manner known in the art, in a similar way to the compressed approximate trie of FIG. 4A. The probabilistic trie 33 is compressed by concatenating adjacent non-branching nodes. FIG. 4C shows the result of the compression process on the probabilistic trie of FIG. 4B. Paths within the probabilistic trie may now contain multiple characters and some of the arrows begin and end at the same node.

The system of the present disclosure uses a probabilistic trie 33 rather than an approximate trie 13. The probabilistic trie has the advantage of mapping probability values to character strings. Furthermore, the probabilistic trie 33 is not restricted to a specified maximum depth. However, the choice of trie will be dependent on such factors as the available memory.

As the skilled reader will be aware, the KeyPressVector 31 and probabilistic trie 33 of the present disclosure can be used to correct for mistakes in the character entry of a word, in addition to the omission of punctuation marks. Analogous to the example of the insertion of an apostrophe which was omitted by the user, the present system can be configured to insert a repeated character which was omitted by the user. For example, if the user were trying to type 'accommodation', but typed the characters 'a-c-o', the system can account for the missing 'c' by inserting a 'c'. For this example, the KeyPressVector 31 for the character sequence could be [("a"→1), ("c"→0.9, "cc"→0.1), ("o"→1)]. This KeyPressVector 31 encodes the specific case where a single consonant input is associated with its double counterpart, e.g. c→cc, d→dd, m→mm, etc.

The KeyPressVector 31 can be generalised to account for a missing character entry after each and every character inputted into a system. For example, the KeyPressVector could be generalised to be [("a"→0.9, "a*"→0.1), ("c"→0.9, "c*"→0.1), ("o"→0.9, "o*"→0.1)]. In this example of a KeyPressVector 31, every single character input is associated with a potential double character input, but the identity of the second character is left unspecified. The omitted character symbol "*" is implemented in the probabilistic trie by following all possible paths from the current node, with the specified probability. So, in the example above, given the first element: ("a"→0.9, "a*"→0.1) the path corresponding to the character "a" will be followed with probability 0.9. and all existing paths corresponding to "a" followed by another character will also be followed, but with probability 0.1. Examples of such paths could include "ab", "ac", "ad", "a-" etc.

A similar concept can be implemented to insert a null character, i.e. to ignore a character entered by a user. For example if the user inserted the characters 'n-e-c-c' when trying to type 'necessary', the system can be configured to ignore a repeated consonant, i.e. to search for the sequence 'n-e-c' only. An example KeyPressVector 31 for the character entry 'n-e-c-c' could therefore be [("n"→1), ("e"→1), ("c"→1), ("c"→0.9, ""→0.1)], where ""→0.1 corresponds to matching an "empty" string with an (example) probability of 0.1. The KeyPressVector can be generalised to 'ignore' each character entered by the user, by inserting a null character with a certain probability after each character entered. Such a generalised KeyPressVector 31 may be [("n"→0.9, ""→0.1), ("e"→0.9, ""→0.1), ("c"→0.9, ""→0.1), ("c"→0.9, ""→0.1)]. The null character, "", is implemented in the probabilistic trie by the KeyPressVector remaining at the current node. These concepts can be extended to associate a small probability that the user has omitted a character or inserted the wrong character after the entry of each and every character in a sequence entered by a user.

Obviously, such an implementation will increase the computational costs associated with the system (the "*" operator has a dramatic effect on the number of paths followed), however, it will allow the system to be more tolerant to the incorrect spelling or typing of a user Reverting to FIG. 2A or 2C, a candidate filter 15 can be applied by the language model to narrow the set of predictions returned from the approximate trie 13 so that it contains only identifiers for candidates that are truly allowed by the current word input. Candidate filtering is only necessary when the length of the current input exceeds the maximum depth of the approximate trie, which, to be of any use, must be at least 1, and values of around 3-5 are usually appropriate. Even then, however, it need not be used. The depth of the approximate trie is specified a-priori for each language model. The candidate filter looks up the actual candidate term string values represented by the numerical identifiers in the set of numerical identifiers returned by the approximate trie and processes them one-by-one, comparing each with the current input. For a given candidate string s, if the current input is not a substring of s then it is discarded as not a true candidate.

As the reader will understand, a candidate filter is not required to narrow the predictions returned by a probabilistic trie 33 (see FIGS. 2B and 2D), because a probabilistic trie 33 is not restricted to a specified maximum depth.

The context input 12 comprises the sequence entered so far by the user, directly preceding the current word. This sequence is split into 'tokens' by the Multi-LM 8, where a token is an individual term, punctuation entity, number etc. The Multi-LM 8 feeds the tokenised sequence data 12 into each language model as a context input. If the system is generating a prediction for the nth term, the context input 12 will contain the preceding n−1 terms that have been selected and input into the system by the user.

Figure 5:
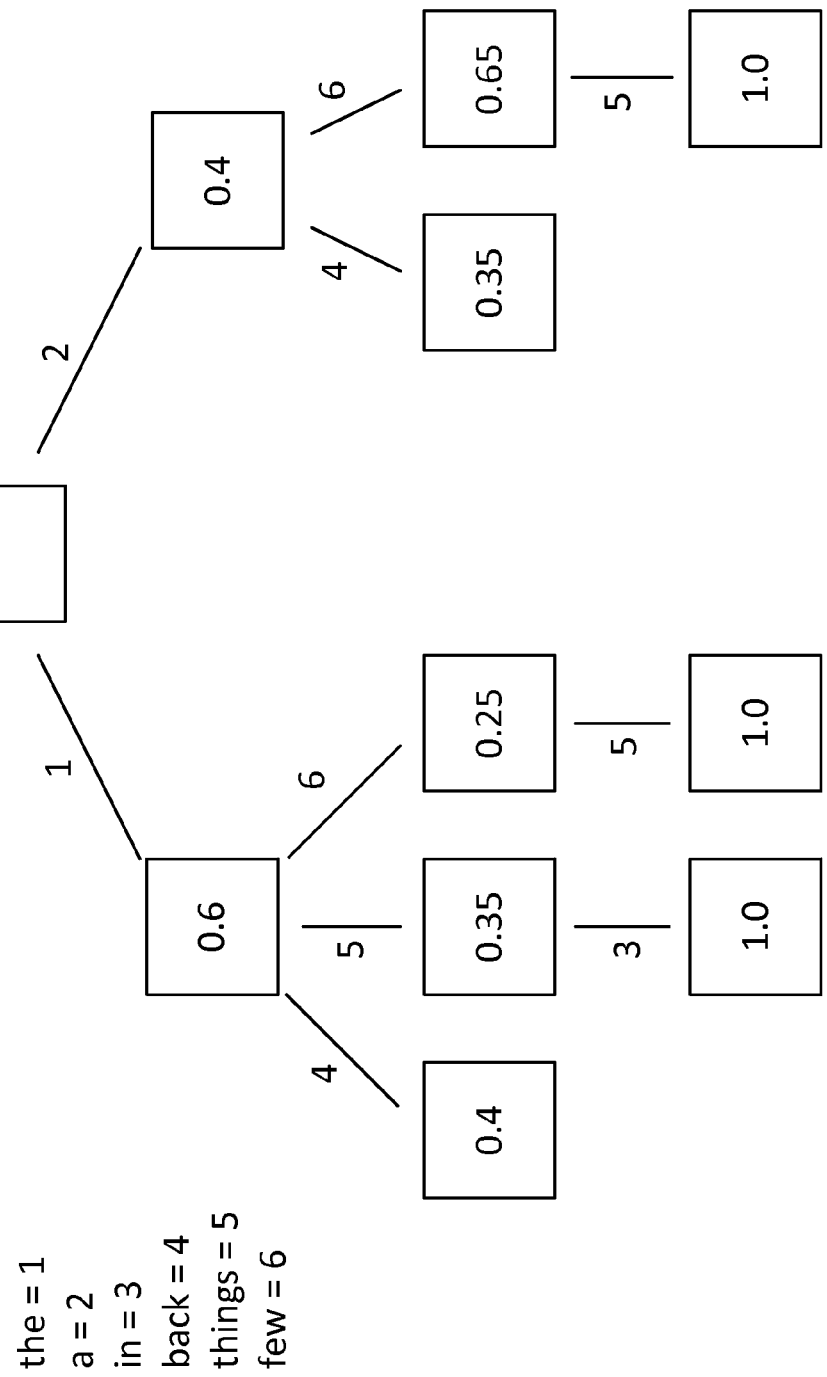
FIG. 5 is a schematic of an n-gram map.

The language model utilises an n-gram map 14 to generate word and/or phrase predictions based on the context input 12. An n-gram map is an associative map structure, as schematically shown in FIG. 5. In the n-gram map 14, terms in the vocabulary are associated with numerical identifiers (short integers) which are stored in the map and associated with probability values. The combined probabilities of child nodes for a single parent always sum to 1. Identifiers are assigned to terms such that the resulting ordering is from most-to-least frequent, as estimated from the training data used to train each language model. Therefore, the identifiers define an ordering by P(term), which is the unigram probability of terms in the language. This is important because it optimises the efficiency at which the text prediction engine can conduct n-gram retrieval, by making the approximation P(term|context)~P(term). This approximation is made by ordering the terms at a given n-gram map level by P(term) rather than their true probabilistic ordering which would be P(term|context).

In the present system, n-gram probabilities are stored in a compressed manner to facilitate wide coverage and rapid access on memory-limited devices. The probability values are compressed, possibly according to the (lossy) discretization procedure, in which the values are discretized and spread over the range of values available in a single byte of memory. Given a true probability value p, the following formula is used to map it into a single byte of memory: b=int(abs(log(p))*10), where int(x) yields the rounded integer part of real-valued x, and abs(x) yields the absolute value of x.

The n-gram maps can be further compressed by representing string values as short-integer-valued numerical identifiers and by storing higher-order entries "on top of" lower-order entries. So, for example the trigram "in the morning" is stored in the same location as the bigram "in the", but with a link to the additional n-gram head term "morning", i.e. by storing a set of numerical values (identifiers) for all subsequently-allowable sequences at each node in the n-gram map.

To generate predictions from an n-gram map 14, at each map node 21 the language model conducts a binary search to locate specified subsequent child nodes. For example, if the context comprises term1 and term2, the language model will first locate the node for term1. Term2 is then the specified child node that will be searched for. To facilitate this search, child nodes are ordered numerically by their identifiers at each parent node. The node that is being searched for may contain a large number of children, but it is only the high probability candidates that are of interest. Because the nodes are automatically ordered by P(term), the language model can be configured to return only the first k children, where k is a preset value. This method assumes that the highest probability candidates under P(term|context) will reside in the set of the k highest probability candidates under P(term), as long as k is large enough. It is not feasible to order child nodes by P(term|context) as this would require a different map ordering for every node and vastly increase memory overheads.

The generation of predictions from an n-gram map 14 is described further in the following illustrative example. If the language model is searching for the highest probability term candidates, given the two context terms "in" and "the", the language model will search for the terms t that maximise the trigram (3-gram) probability P(t|in the). The language model first looks up the identifier for "in" and then conducts a binary search in the first level of the map to locate the identifier (if it exists). Following from the "in" node, the language model looks up the identifier for "the" and conducts a search to locate it in the next map level. It is likely that this node has many children because "in the" is a common prefix, so the language model is configured to return the identifiers for the first k children (inversely ordered by P(term)), which might correspond to terms such as "morning", "first", "future", "next", "same" etc.

The n-gram map structure described thus far is used in static language models. Static language models are immutable once they have been constructed and directly store compressed n-gram probabilities; they are generated from pre-existing data and are then compiled into binary format files which can be read at run-time.

Conversely, dynamic language models, such as the user specific language model 7, can be updated at any point, and predictions from this type of model are constantly changing as new data is processed.

A dynamic language model is updated in one of two ways: to include a term which is not previously present in a dynamic language model vocabulary; and to update the frequency of an existing term in a particular n-gram context. The dynamic n-gram map stores the frequency at which n-gram paths are input by a user, wherein an 'n-gram path' refers to a particular term and up to n−1 terms of preceding context.

For a current term t, current context c, and dynamic language model D, if t does not exist in the vocabulary of D, then the dynamic language model D maps the term t to a new identifier and inserts it into the approximate trie or the probablilistic trie. To enter a term which does not exist in the vocabulary of the language model D, a user can insert the term by inputting it character-by-character into the user interface of the system. The dynamic language model D then follows the path represented by term t and its context c in the n-gram map and new nodes are created if they do not already exist, thereby creating new n-gram paths in the language model dependent on the preceding context c of the current term t. Paths are added to the dynamic n-gram map for varying context lengths, from no context to n−1 terms of context, where n is the maximum n-gram order for the language model. When a user enters the term t at a later time, the language model D increments a count value stored at the node, of the n-gram map, representing the term t by one, and increments the total value of its parent node by one also. In this way, the frequency of input of the n-gram paths comprising a term t and its varying context, from no context to n−1 terms of context, are updated in the n-gram map.

Figure 6:
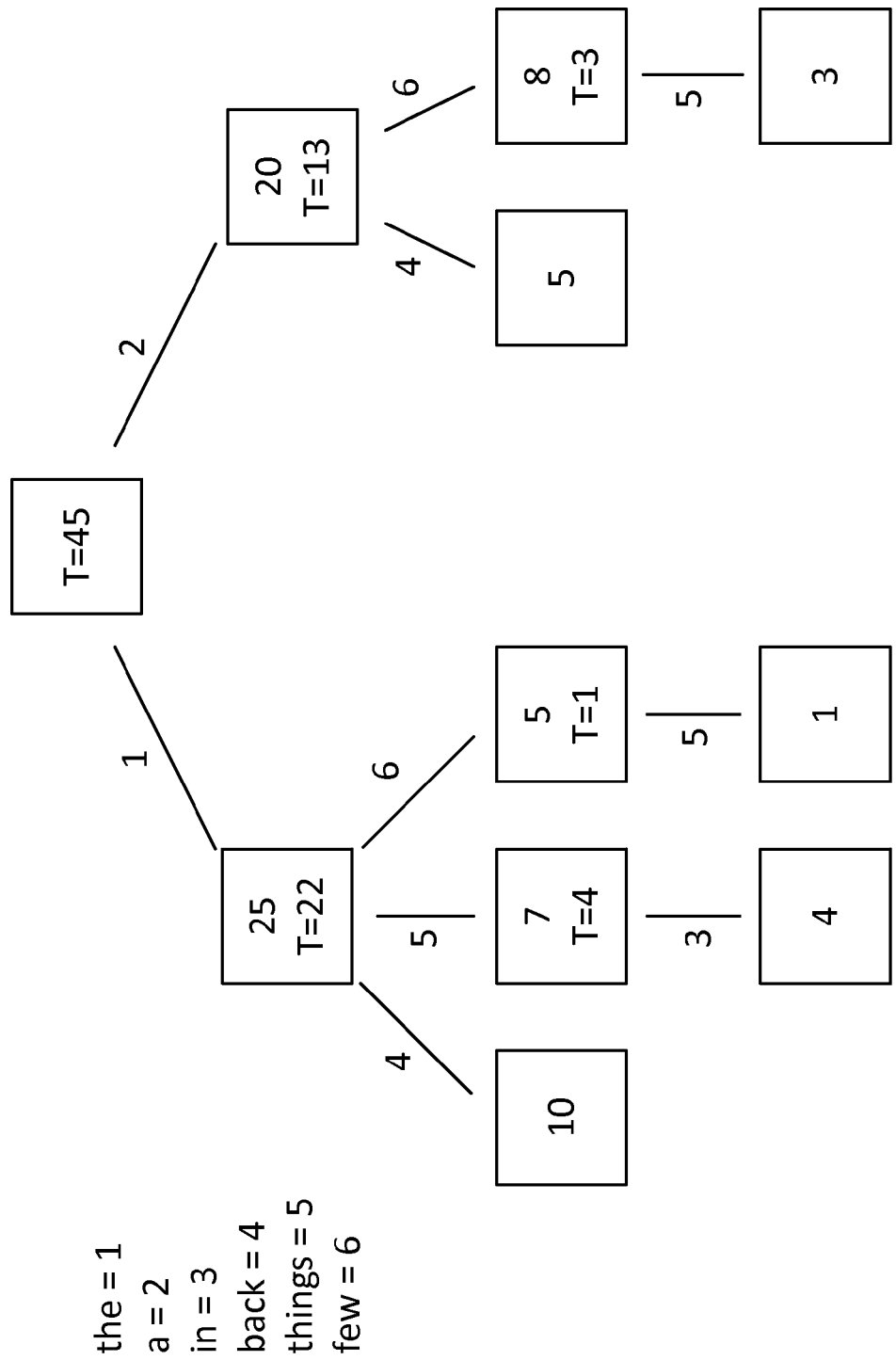
FIG. 6 is a schematic of a dynamic n-gram map.

The n-gram probabilities of a dynamic language model are not stored directly, rather frequency statistics are stored. An example of a dynamic n-gram map is shown in FIG. 6. Each node stores a frequency value, rather than a probability, along with a combined frequency for its children (denoted by "T="). Probabilities are computed on-the-fly from these frequency values by dividing the count for a particular term by the total value at its parent node. A smoothing constant is added to each parent total to avoid unreasonably high estimates for sparse events. The higher the value chosen for the constant, the more slowly the probabilities from the user specific language model will increase (because the probability for a particular term is determined by dividing its count by the value of its parent node). In an embodiment, a smoothing constant of 500 is chosen. However, it will be appreciated that the value of the smoothing constant is a matter of choice.

The advantage of the dynamic language model structure is that it allows rapid updating. However, the disadvantage of this type of language model is that its memory and computational requirements are significantly higher than in its static counterpart.

As stated previously, each language model has two input feeds, the current word input 11 and the context input 12, where the current word input 11 can be used to generate a KeyPressVector 31. In order to generate a single set of predictions 20 for a given language model, the language model must compute the intersection of the set of candidates returned by the approximate trie 13 and optional candidate filter 15, and that returned by the n-gram map 14. Alternatively, the language model must compute the intersection of the set of candidates returned by the probabilistic trie 33 and that returned by the n-gram map 14. A set of candidates is represented by a set of numerical identifiers.

To compute the intersection of the set of candidates returned by the approximate trie and the n-gram map, an intersection mechanism 16 first determines which of the two sets is smaller. The smaller set of identifiers is used as a base set. The mechanism 16 iterates through the base set of identifiers and looks up each identifier in the base set in the other set. If a match is found for the identifier in question, the intersection mechanism 16 places the identifier in a new set which represents the intersection between the two sets. In this embodiment, the probability associated with an identifier in the new set is its probability as stored in the n-gram map. This is because the candidates returned from the approximate trie do not have a probability value associated with them. The approximate trie is interrogated to return possible candidates only.

To compute the intersection of the set of candidates returned by the probabilistic trie 33 and the n-gram map, the intersection mechanism 16 follows the same procedure as set out with relation to the approximate tri 13. However, in the case of the probabilistic tri 33, the candidates returned from the probabilistic tri 33 will have a probability value associated with them. Therefore, if a match is found between the candidates returned from the n-gram map and those returned from the probabilistic trie 33, the intersection mechanism 16 computes the product of the two probabilities and places the identifier, mapped to its resultant probability, in a new set which represents the intersection between the two sets.

The language model can be configured to apply one or more filters to the predictions generated by the intersection mechanism 16. In one embodiment, the first filter that is applied is a bloom filter 17, which is followed by a topic filter 18 and optionally additional filters 19 to generate the output predictions 20 for a given language model. However, in other embodiments the ordering of the applied filters or the types of applied filter can be changed.

A Bloom filter 17 is a randomised data structure used to store sets of objects in a highly efficient manner using bit-arrays and combinations of hash functions. The present system uses an implementation of a multi-bit-array Bloom filter 17 to reorder prediction candidates, generated at the intersection 16, on the basis of higher-order n-gram statistics which for memory reasons cannot be stored in the n-gram map 14. The present system utilises a technique for associating n-grams 14 with probability values in the Bloom filter 17. A technique to associate Bloom filter entries with probability values is disclosed in Talbot and Osborne, 2007, *Proceedings of the* 2007 *Joint Conference on Empirical Methods in Natural Language Processing and Computational Natural Language Learning*, pp. 468-479.

For a given set of prediction candidates and a certain number of context terms, the Bloom filter 17 reorders the predictions to reflect new probabilities. The present system utilises a log-frequency Bloom filter (Talbot and Osborne) which maps a set of n-gram entries to respective probability estimates. In the present system, the language model generates a set of predictions P based on a set of up to n−1 context terms C. A log-frequency Bloom filter F, which associates n+1-gram term sequences with probability estimates, can be used to generate a new prediction set in which the previous predictions are reordered. For each term prediction t in P, the language model is configured to search F based on a context of c+C+t to yield a new probability value v, wherein C comprises the n−1 terms of preceding text input used to search the n-gram map; t comprises the term predictions in P (those in the determined intersection); and c comprises an extra term of context, immediately preceding the n−1 terms used to search the n-gram map. Therefore, the n+1-gram map of the Bloom filter is searched for each n+1 term sequence, c+C+t, to determine whether that n+1-gram path exists and, if so, the probability associated with that path. A new prediction set is then constructed using the new probabilities. In general, if p is the final number of predictions requested, then the filtering process will operate on a number greater than p (specified a-priori) so that the reordering process may result in a different set of predictions returned to the user.

In some embodiments, the language model can be further configured to apply a topic filter 18. N-gram statistics yield estimates of prediction candidate probabilities based on local context, but global context also affects candidate probabilities. The present system utilises a topic filter 18 that actively identifies the most likely topic for a given piece of writing and reorders the candidate predictions accordingly.

The topic filter 18 takes into account the fact that topical context affects term usage. For instance, given the sequence "was awarded a", the likelihood of the following term being either "penalty" or "grant" is highly dependent on whether the topic of discussion is 'football' or 'finance'. Local n-gram context often cannot shed light on this, whilst a topic filter that takes the whole of a segment of text into account might be able to.

The function of the topic filter is to accept a set of predictions and yield a variant of this set in which the probability values associated with the predicted terms may be altered, which may consequentially alter the ordering of predictions in the set. Given an input prediction set P and current input text T, the topic filter carries out the following operations: predict a weighted set of categories representing the most probable topics represented in T; predict a weighted set of topic categories for the terms/phrases in P; and modify P such that the probabilities of predictions with similar topic categories to T are inflated relative to those with dissimilar topic categories.

The prediction of topic categories for an arbitrary segment of text is accomplished through the machine learning paradigm of classification, which consists of a framework within which a mechanical 'learner' induces a functional mapping between elements drawn from a particular sample space and a set of designated target classes (see B. Medlock, *"Investigating Classification for Natural Language Processing Tasks"*, VDM Verlag 2008, for a more detailed introduction to classification concepts and methods).

A classifier is employed in the topic filter 18 based on the principle of supervised learning in which a quantity of training data must first be collected and assigned labels representing topic categories. From this data, the classifier learns to infer likely topic category labels for new data. In the present case, an individual data sample is a segment of text. For instance, when building a classifier to label data in the news domain, a collection of news stories is required where each is pre-assigned topic category labels representing its dominant topic(s), e.g. 'sport', 'finance', 'entertainment' etc. The set of topic categories is pre-defined, and may be hierarchical, e.g. 'football' might be a subcategory of 'sport'.

Once the classifier has been trained on pre-existing data, it is able to predict the most likely topic categories for a new segment of text, along with a numerical value for each prediction representing the degree of confidence with which the prediction has been made. For example, given the following text segment, "David Beckham will stay at AC Milan until the end of the season after a 'timeshare' deal was finally agreed with Los Angeles Galaxy", a trained classifier might yield the following category predictions 'sport'→0.8; 'finance'→0.3, wherein the numerical values represent the confidence that the classifier has in that particular prediction. The numerical values can be interpreted as an estimate of the level of representation of that particular topic in the given text segment.

The prediction of topic categories for individual terms/phrases from the prediction set P can be carried out in the same manner as for input text segments, using the classifier. This yields a set of weighted topic category predictions for each term/phrase prediction in P.

The modification of prediction probabilities in P requires the definition of a 'similarity metric' between topic category prediction sets. This takes the functional form: $sim(S, S')=v$, where S and S' are topic category prediction sets and v is the real-valued output from the function sim, representing the degree of similarity between S and S'. There are many different methods of implementing sim and any one is appropriate. For instance, the topic category prediction sets can be interpreted as vectors in an m-dimensional space where m is the number of topic categories. Under this interpretation, the weight assigned by the classifier to a particular category c is the extension of the vector in the c-dimension. Well-established techniques can be used for estimating vector similarity, e.g. by applying magnitude normalisation and taking the inner (dot) product.

Once the similarity metric has been defined, the final stage within the topic filter 18 is to use the similarity values to modify the probabilities in P. A number of techniques can be chosen for accomplishing this, but one possibility is to inflate the probabilities in P by a small value in inverse proportion to their rank when ordered by topic similarity with T, for instance in accordance with the formula, $p_{final}=p_{intial}+k/r$, where p is the prediction probability drawn from P; r is the rank of the term associated with p, when ordered by $sim(S_p, S_T)$ (rank 1=highest similarity); and k is a pre-defined constant.

The language model architecture of the present system is configured such that any number of additional filters 19 can used to reorder candidate probabilities. At each stage, the language model will already possess a candidate prediction set, and if a threshold on computation time is exceeded, the candidate set can be returned and additional filters 19 can be easily bypassed.

The language model returns its predictions 20 as a set of terms/phrases mapped to probability values. As explained in the discussion of FIG. 1, the output predictions 20 from each language model are aggregated by the multi-LM 8 to generate the final set of predictions 10 that are provided to a user interface for display and user selection.

From FIGS. 2A-d, it can be seen that in the absence of a current word input 11, and therefore the absence of a KeypressVector 31 also, the predictions are based on a context input only 12.

In some embodiments, the system can use beginning of sequence markers to generate a list of word or phrase predictions 9 in the absence of any preceding user input, enabling a user to select a word or phrase to commence the input of a sentence. The system can also use "beginning-of-sequence" (BOS) markers to determine word or phrase predictions after end-of-sentence punctuation and/or after new line entry.

The language models use BOS markers which are used as context 12 in the absence of any preceding user input. In the absence of preceding user input, the language models will generate certain terms such as "Hi", "Dear", "How", "I" etc. because they are more likely than high probability unigram terms such as "of", "to", "a" etc. The predictions from each language model 20 are based on BOS markers. One of the entries in the first level of the n-gram map will be the BOS marker, and this will be used as context in exactly the same way as standard input terms, e.g. if the BOS marker is '^' then the n-gram map might contain (amongst others) the following paths: "^ Dear"→0.2; "Hi"→0.25; "^ How"→0.1; and "^ I" →0.15. BOS markers are automatically inserted into the context when a user enters end-of-sentence punctuation (period, exclamation mark, question mark) or enters the 'return' character.

As the user specific language model 7 is a dynamic language model, over time it will learn a user's language style, thereby generating predictions that are more likely to reflect a particular user's language style. However, if the text prediction engine generates a list of word or phrase predictions 9 which fails to include the word desired by the user, the user can tailor the list of words or phrases generated by the text prediction engine by inputting a character 11 through the user interface. The language model then utilises an approximate trie 13 or a probabilistic trie 33, along with an n-gram map, to generate a list of word predictions based on the current word input 11.

As stated previously, with reference to FIG. 1, the present system utilises a mechanism 5, static pruning, across all static language models, to reduce the amount of information stored in the system. In the following section static pruning is described in relation to the pruning of a single language model.

Given two language models L1 and L2, the pruning of L1 is achieved by comparison to a reference language model, L2. Each language model comprises an n-gram map, in which terms in the vocabulary are associated with numerical identifiers which are stored in the map and associated with probability values. Because identifiers are assigned to terms such that the resulting ordering is from most-to-least frequent, the identifier that is assigned to a given term in one language model does not necessarily match the identifier assigned to the same term in a different language model. Therefore, to achieve static pruning, the static pruning mechanism 5 generates a conversion table between the vocabulary identifiers in L1 and the vocabulary identifiers in L2. The conversion table maps the identifier for a given term t in L1, to the identifier for the term t in L2. For example, if the term "the" is identified by the numerical identifier 1 in L1 and the identifier 2 in L2, then given the identifier 1 for L1, the conversion table will yield the identifier 2 for L2.

The static pruning mechanism 5 traverses the n-gram map of L1 such that each node is visited exactly once. For each path followed in L1, the corresponding path is attempted in L2 by using the conversion table to convert the path identifiers in L1 to those of L2. The static pruning mechanism 5 conducts a binary search to locate specified subsequent child nodes. For example, if the context comprises term1 and term2, the static pruning mechanism 5 will first locate the node for term1. Term2 is then the specified child node that will be searched for. By conducting such a search in L2, identical paths can be identified. If no identical path exists in L2, the static pruning mechanism 5 moves on to search in L2 for the next path of L1. If an identical path exists in L2, then the static pruning mechanism 5 makes a comparison of the probabilities at each node. If the L1 probability is smaller than the L2 probability, and the node is terminal, then the static pruning mechanism 5 removes this node from L1.

Figure 7:
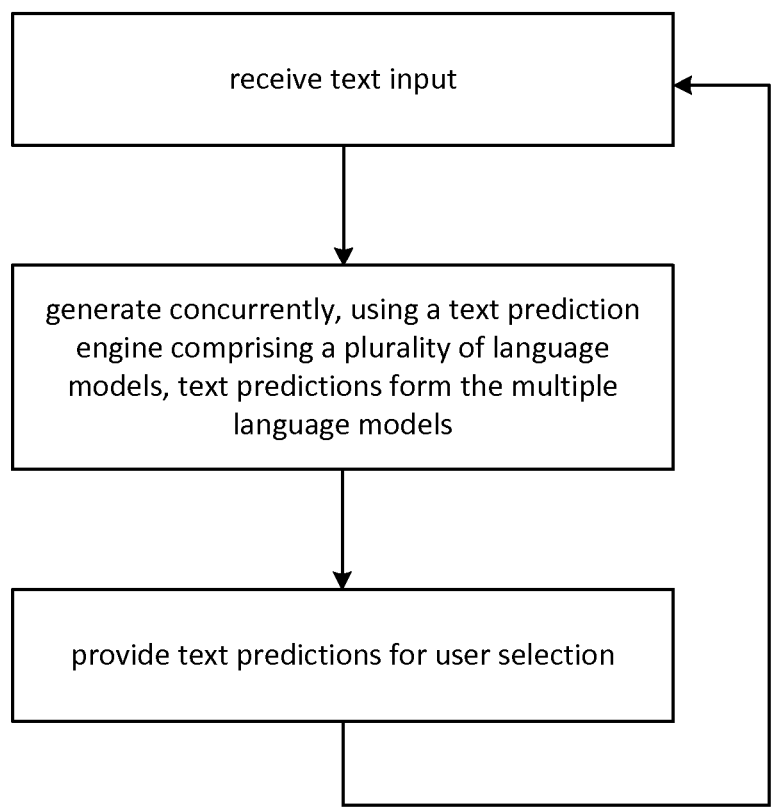
FIG. 7 is a flow chart of a method for processing user text input and generating text predictions for user selection according to the disclosure.

A method according to the present disclosure is now described with reference to FIG. 7 which is a flow chart of a method for processing user text input and generating text predictions. In the particular method described, the first step comprises receipt of text input. Analogous to the foregoing discussion of the system according to the present disclosure, the text input can comprise current word input 11 (which can be represented by a KeyPressVector 31) and/or context input 12. Therefore, the input stream can comprise character, word and/or phrase inputs and/or punctuation inputs. In embodiments where the predictive text engine also predicts punctuation, the punctuation items are stored in the n-gram maps with the text terms. Single punctuation items ('!', '?') and blocks of punctuation ('!!!!!!!', ' . . . ') are handled as single prediction units.

The method further comprises the steps of generating concurrently, using a text prediction engine comprising a plurality of language models, text predictions from the multiple language models; and providing text predictions for user selection. As shown in the flow chart of FIG. 7, a loop is formed when a user inputs a sequence because this sequence, which may include terms selected from previous prediction sets, is used to update the dynamic language model which contributes to the next set of predictions 9. The loop is formed by the insertion of an end-of-sequence punctuation mark, or a 'return' keypress for example. Hence, predictions are constantly updated based upon previous sequence inputs.

By way of an example, say a user has already entered the sequence "Hope to see you" and is intending to enter the terms "very" and "soon" in that order. The final prediction set 9 that is provided by the text prediction engine 100 to a user interface for display and user selection, may comprise 'all', 'soon', 'there', 'at', 'on', 'in'.

The intended next term "very" is not in the currently-predicted list of terms. The user can enter multi-character 'v/x/z' input to prompt the predictive text engine 100 to provide more relevant predictions. The information about the current context "Hope to see you" and the currently-entered multi-character 'v/x/z' is passed to the text prediction engine 100 where the Multi-LM 8 tokenises the context and adds the beginning-of-sequence marker '^': "Hope to see you"→"^" "Hope" "to" "see" "you".

The Multi-LM 8 then passes the tokenised sequence data 12 and the multi-character current input 11 to each of the language models. Each language model receives a copy of the current input 11 and the tokenised context 12.

Within each language model, the current input (which may be represented as a KeyPressVector 31) is fed into the approximate trie 13 or the probabilistic trie 33, which in this case returns the set of identifiers for all vocabulary terms that begin with either 'v' or 'x' or 'z'. It accomplishes this by following the initial paths to the nodes corresponding to the characters 'v', 'x' and 'z', concatenating the identifier value sets found at each node and returning the combined set. In the case of the identifiers being returned by an approximate trie 13, the set of identifiers can be narrowed using a candidate filter 15. However, in the present example, no filtering is required because the length of the current input will be less than the maximum depth of the approximate trie. Candidate filtering is only necessary when using an approximate trie 13 and even then, only when the length of the current input exceeds the maximum depth of the approximate trie, which as noted previously, to be of any use, must be at least 1, and usually around 3-5. The depth of the approximate trie is specified a-priori for each language model.

Using the tokenised context 12, the n-gram map 14 is queried by the language model for a given n-gram order, i.e. a number of context terms. Each language model contains n-grams up to a maximum value of n. For example, a particular language model may contain 1, 2 and 3-grams, in which the maximum n-gram order would be 3. The system begins by taking the largest possible amount of context and querying the n-gram map to see if there is an entry for the path representing that context. So, for example, if a given language model has a maximum n-gram order of 3, in the present example, the system would begin by searching for the path corresponding to the context phrase "see you". The system then extracts the first k children of the node corresponding to this path, where k is an a-priori parameter of the system. In static language models, each child node contains a term identifier and a compressed probability value that can be extracted directly for use in prediction ordering. In dynamic language models, the node contains a frequency value which must be normalised by its parent 'total' value to yield a probability.

Given a set of identifiers from the approximate trie 13 or set of identifiers mapped to probability values from the probabilistic trie 33, and a set of identifiers mapped to probability values from the n-gram map 14, the intersection is computed by an intersection mechanism 16. If the number of predictions in the resulting set is less than p, or some multiple of p (where p is the required number of predictions), the system continues to look for further predictions by returning to the n-gram map 14 and considering smaller contexts. In this example, if the context "see you" did not yield enough predictions, the system would consider the context "you" (second level in the n-gram map), and if that still did not yield the required number, the system would revert to an empty context (first level in the n-gram map).

In the present example, the system has previously searched for the path corresponding to the context phrase "see you". At this stage, the language model has obtained a set of predicted terms which are compatible with the context and the current input (which may be represented by a KeyPressVector 31), ordered by their respective probability values, as extracted from the n-gram map. For example, the prediction set may comprise the identifiers corresponding to the terms "very", "visit" and "x". A new prediction set is generated, with the previous predictions re-ordered, by using the Bloom filter component 17. In this case, the Bloom filter might contain 4-gram sequences associated with probability estimates. The language model would query the Bloom filter using a new context comprising the previous context used to search the n-gram map ("see you"), the set of current predictions ("very", "visit" and "x"), and optionally, an extra context term (in this case "to"). Hence, in this example, the Bloom filter would be queried using the following sequences: "to see you very"; "to see you visit"; and "to see you x".

The probabilities mapped to the terms "very", "visit" and "x" in the current prediction set would then be replaced by the values returned from the Bloom filter and consequentially reordered. Additional filters would operate in a similar manner. In general, if p is the final number of predictions requested, then the filtering process would operate on a number greater than p (specified a-priori), such that the reordering process may result in a different set of predictions returned to the user.

Once all filters have been applied, a set of predictions (terms+probability values) 20 is returned by each individual language model to the Multi-LM 8, which then aggregates them by inserting all predictions into an ordered associative structure, or an STL multimap, and choosing the p most probable and returning them as the final prediction set 9. In our example, the prediction set 9 presented to the user might be 'very', 'via', 'visit', 'view', 'x'

The intended term "very" now appears on the prediction list and can be selected. Once selected, the context, now including the term "very", becomes "Hope to see you very" and the current input is empty. The preceding method steps are iterated in the same manner, except that this time the approximate trie or the probabilistic trie is bypassed (because there has been no character entry, i.e. no current word input), and the prediction candidate set is drawn solely from the n-gram map. This might yield the following prediction set 'much', 'soon', 'good', 'many', 'well'.

The term "soon" occurs in the prediction set, so the user can select it, and once again the context is updated, this time to include the new term, "Hope to see you very soon", and the current input is set to empty. This process continues to iterate as input progresses.

When the user ends a sequence by pressing 'return' or an end-of-sequence punctuation term, the user interface is configured to pass the current sequence to the text prediction engine 100, wherein the Multi-LM 8 is configured to 'tokenise' the current sequence which it then passes to the user specific language model 7. The dynamic language model 7 assigns numerical identifiers to the tokenised input 12 and updates the n-gram map 14. Using the same example, consider that the user subsequently adds an exclamation mark at the end of the sequence to yield: "Hope to see you very soon!". The following stages would occur: The Multi-LM 8 tokenises the sequence and inserts the BOS marker, "Hope to see you very soon!" becomes, for example, "^" "Hope" "to" "see" "you" "very" "soon" "!"; and for each term in the sequence (and its respective context), the dynamic language model adds n-gram paths to the dynamic n-gram map constituting varying context lengths, from no context to n−1 terms of context, where n is the maximum n-gram order for the language model. For instance in the case of the above example, assuming n=4, the following paths would be added:

"^"
"Hope"
"^" "Hope"
"to"
"Hope" "to"
"^" "Hope" "to"
"see"
"to" "see"
"Hope" "to" "see"
"^" "Hope" "to" "see"
"you"
"see" "you"
"to" "see" "you"
"Hope" "to" "see" "you"
"^" "Hope" "to" "see" "you"
"very"
"you" "very"
"see" you "very"
"to" "see" "you" "very"
"soon"
"very" "soon"
"you" "very" "soon"
"see" "you" "very" "soon"
"!"
"soon" "!"
"very" "soon" "!"
"you" "very" "soon" "!"

For each n-gram path, the dynamic language model 7 increments the frequency value of the corresponding node by one, and also increments the total value for the parent by one. If a given term does not exist in the dynamic language model vocabulary, it is added by the language model, and assigned a new identifier.

Figure 8:
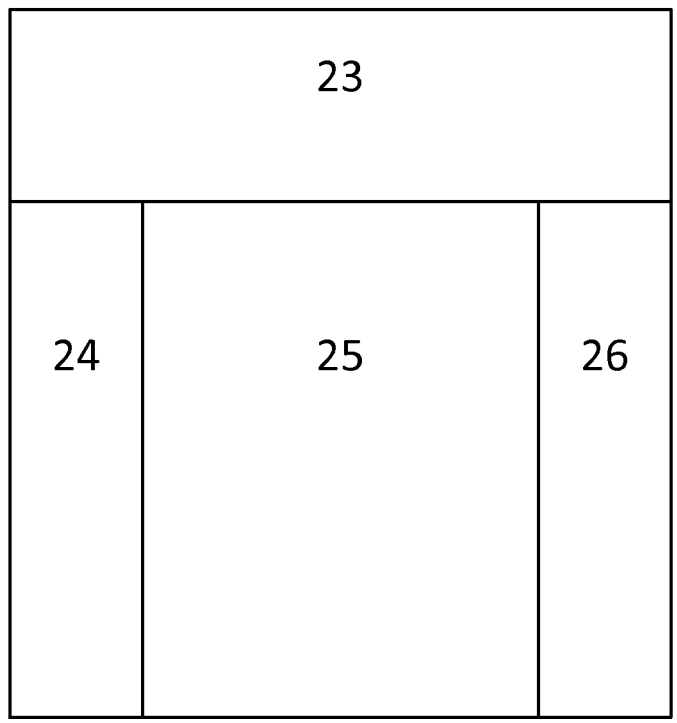
FIG. 8 is a schematic of the user interface according to the disclosure.
Figure 8A:
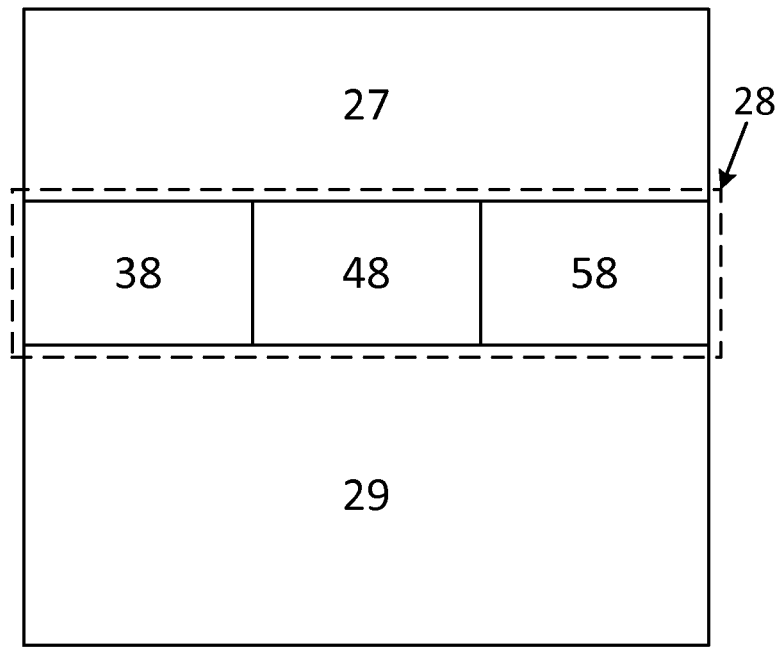
FIG. 8A is a schematic of an alternative user interface according to the disclosure.

The present disclosure also relates to a user interface. In particular it relates to a touch-screen interface, through which the system of the present disclosure can be operated. FIG. 8 provides a schematic representation of a generic user interface. FIG. 8A provides a schematic of an alternative generic user interface. As shown in FIG. 8, the basic user interface comprises a typing pane 23, a text prediction pane 25 which may be located centrally for example and two identical panes, which may be located to the sides, for single/multi character, punctuation or symbol entry 24, 26. In the alternative embodiment, as shown in FIG. 8A, the basic user interface comprises a typing pane 27, a prediction pane 28 and a single pane for single/multi character, punctuation or symbol entry 29. The prediction pane 28 comprises an actual character entry button 38, a most likely word button 48 and an alternative word button 58.

In the embodiment according to FIG. 8, the prediction pane 25 comprises a set of buttons, each button displaying a word from a set of words or phrases that has been predicted by a text prediction engine. The typing pane 23 comprises a pane in which user inputted text is displayed. The side panes 24, 26 can comprise a set of buttons corresponding to character, punctuation or numeral keys. In the case of the default screen, the side panes 24, 26 comprise character buttons. However, in other configurations panes 24, 25, 26 are all used for character, punctuation and numeral buttons, and the screens are toggled so that a user can move between prediction, numeral and punctuation screens.

The difference between the two user interface embodiments is in the prediction pane 25, 28. In the alternative embodiment, the prediction pane 28 comprises an actual character entry button 38 which enables a user to input the sequence of characters they have typed into the system (rather than entering a word that has been predicted by a text prediction engine of the system). This enables the user to input words which are not recognised by the system and which would not therefore be predicted by the system. The prediction pane 28 also comprises a most likely word button 48 which displays the word with the greatest probability associated with it from a set of words or phrases predicted by a text prediction engine. The prediction pane 28 also comprises an alternative word button 58 which displays a word other than the word with the highest probability (i.e. the word with the second highest probability). Pressing either of the buttons 48 and 58 will cause the associated word to be entered.

In both embodiments of the user interface, the typing pane 23 displays the text entered by a user. A user is able to scroll up or down previously typed text which is displayed in the typing pane, enabling the user to view and edit the text. The typing pane can also comprise a cursor which can be moved to facilitate the editing of the entered text.

The interface is arranged such that when a word button from the prediction pane 25, 28 is pressed, that word is selected and appears in the typing pane 23, 27. The updated input sequence comprising the selected word and its preceding context is passed to the text prediction engine for new prediction generation. In the embodiment of FIG. 8A, the user enters the most likely word by pressing the most likely word button 48 or by entering a space.

In the embodiment of FIG. 8, when a word button is held (for a specified amount of time) or in response to a left-to-right gesture, the current input sequence, excluding the term in question, is passed to the text prediction engine, and the word is displayed in the 'typing pane'. The word is not completed (i.e. a space is not automatically entered after the word), but the letters are used as input for further prediction. For example, if the word 'not' is held, then the text prediction engine generates a list of word predictions 9 including for example 'note', 'nothing', etc., which is provided to the user interface for display and selection in the prediction pane 25. If the language model predicts punctuation, the punctuation terms appear in the same location as the predicted words or phrases, at the bottom of the prediction pane 25, thereby providing the user with consistency. In the alternative user interface of FIG. 8A, the current input sequence is displayed in the typing pane 27 in real time. The actual character entry button 38 also displays the current input sequence, and this is shown alongside the current most likely word button 48 and the alternative word prediction 58. If the user wishes to select the input sequence they have entered, rather than a predicted term, the user presses the actual character entry button 38 to enter this inputted sequence as a finished word.

The user interface of FIG. 8 can be configured for multiple word (phrase) input. An example of two-term phrase input is discussed in relation to a predicted phrase of "and the". In the central prediction pane 25, a button containing the word "and" will be displayed next to, and to the left of, a button containing the word "the". If the user selects the term "the", the sequence "and the" is entered. However, if the user selects "and", only "and" is entered. The same principle can be applied to arbitrary length phrase prediction. The same principle can be applied to the user interface of FIG. 8A, where the most likely word button 48 can be configured to display a phrase input. For example, the most likely word button 48 can be divided into two or more buttons if the most likely prediction is a two or more term phrase, and the alternative word button 58 can show the next most likely phrase prediction.

Character buttons can be displayed in the two side panes 24, 26 or a single main pane 29. The character buttons can have dual or tri character behaviour. This means that either two or three characters are submitted concurrently to the predictor (e.g. if an 'A|B' button is pressed then 'A' and 'B' are submitted). In an embodiment this is the default behaviour on the default screen. The dual character buttons are designed with multi-region behaviour. For instance, pressing the left side of the 'A|B' key will input 'A', the middle region will give both 'A' and 'B', the right side will input 'B' (this combines the benefit of larger, more accessible multi-character buttons, whilst at the same time allowing experienced users the benefit of higher prediction accuracy resulting from single character input). In an embodiment this is optional behaviour on the default screen. Multitap is used when it is necessary to type characters unambiguously (e.g. for entry of a new word that is not in the language model vocabulary). In an embodiment to enter characters unambiguously, a user presses a toggle button to go to a numbers/punctuation screen where all buttons are multitap.

For numbers or punctuation, all buttons are multitap. For example, with tricharacter buttons, the user can press once to enter the first term (of the three term button), press twice to enter the second term, or press three times for the third term to be entered.

The interface can also comprise one or all of the following additional features: a menu button which toggles the screen between prediction, numbers and punctuation, and further punctuation screens; a return button to start a new line of text; a space button to enter a space when pressed or repeatedly enter a space when held; a delete button to delete individual characters when singularly pressed or repeatedly delete characters or words when held; a capitalisation button which toggles between Abc (where only the first letter is capitalised), ABC (all letters capital) and abc (all letters lower case); a send button to send the inputted text as an email (this is specific to an email focused application).

Furthermore, the interface can optionally include an 'undo' button or it can be configured to be responsive to an 'undo' gesture, which is a gesture on a delete button (e.g. movement from left to right). In response to this gesture, or button press, the interface undoes the previous term selection, placing the user back at the position prior to term selection.

For example, if a user has entered 'us' by character input, they will be presented with a selection of word predictions based on this input. In an example where they accidentally select the word "usually" rather than the intended word "useful", the undo gesture allows a user to undo the word selection and return to the original predictions based on 'us', thereby enabling them to select 'useful'. This saves the user from repeatedly pressing the delete button to remove the characters accidentally entered by the incorrect word selection.

The current system includes automatic capitalisation at the beginning of sentences. However, toggling the ABC, Abc and abc options means that the language model will only predict words of the correct form, i.e. if the capitalisation toggle key is set to Abc, the prediction engine will search for terms that follow this capitalisation scheme, e.g. 'Jon' 'Ben' 'Cambridge' etc.

An embodiment of the system and method of the present disclosure takes into account the fact that users often have different typing styles dependent on context, for example the message recipient, the software application (e.g. SMS, email, note-taking, document writing, etc.), the time of the day or day of the week, the message subject, etc.

There is a potential for increased accuracy of text predictions if the text prediction engine takes into account a user's typing styles dependent on context.

Figure 9:
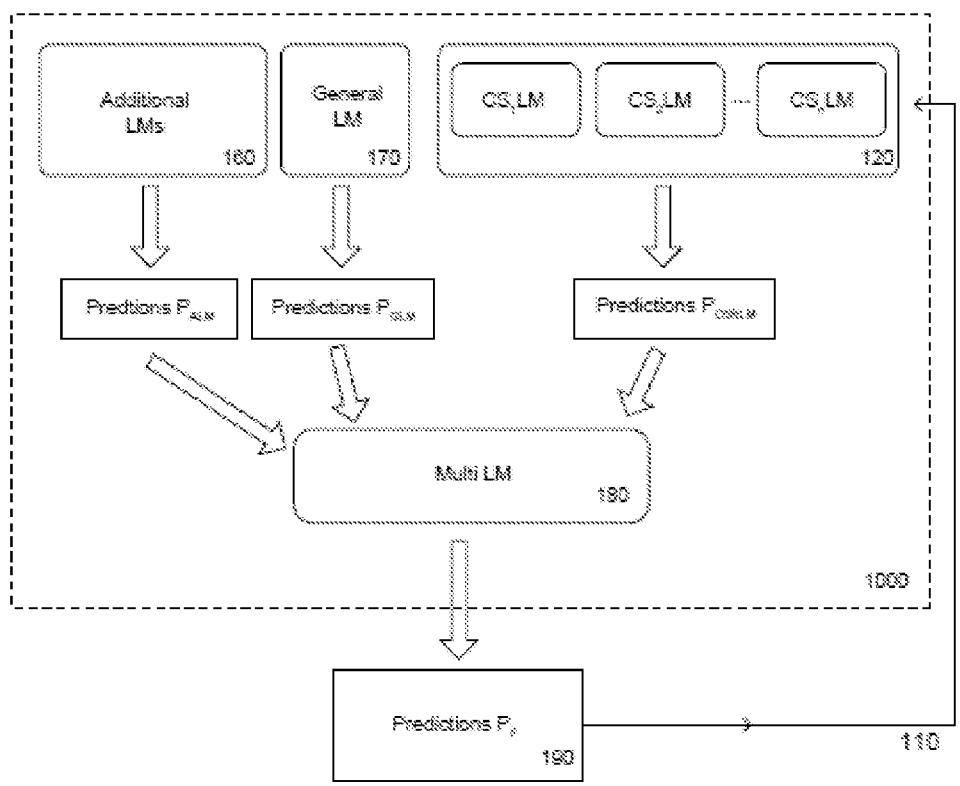
FIG. 9 is a system according to the present disclosure, which may take into account a user's typing style dependent on context.

A first embodiment of a system for inputting text into electronic devices, which may take into account user typing styles dependent on context, is shown in FIG. 9. The system of FIG. 9 is a specific embodiment of the general system illustrated in FIG. 1 and described with respect to that figure. The system comprises a text prediction engine 1000 comprising a general language model 170 (e.g. a model of a human language or a general dynamic language model trained on all user inputted text), at least one context-specific language model 120, and optionally additional language models 160. The prediction engine 1000 further comprises a multi-language model ('Multi-LM') 180 which is configured to combine predictions generated by multiple language models.

The context-specific language model is a language model that is trained on text input by a user for that specific context. The context-specific language model is dynamic, i.e. it is updated when the user inputs text relating to that context. For example, when a user sends a message to a recipient, the recipient-specific language model associated with that recipient is updated by training the language model on the text of that message.

The text prediction engine 1000 is configured to receive text input into a user interface by a user and to generate concurrently using the user text input text predictions from the general language model 170 and a context-specific language model 120. The text prediction engine 1000 is further configured to combine the text predictions generated from the general language model 170 and the context-specific language model 120.

As described above with respect to the system of FIG. 1, the user text input may comprise a current term input and a context input. Each of the general language model 170 and the context-specific language model take as input the current term input and optionally (as will be described below) the context input to generate text predictions (as described previously with reference to FIGS. 2A-D).

The context specific language models 120 may be context-specific context language models, in that they are probabilistic models which comprise probability distributions over sequences of words (i.e. n-gram language models which take into account words preceding the word of interest, i.e. which take as input for the generation of text predictions context input, as well as current word input).

The text prediction engine comprises a plurality of context-specific language models 120 ($CS_1LM_1$, $CS_2LM$, $CS_3LM$, etc.) When a context associated with a context-specific language model is identified, the text prediction engine sources predictions from the relevant context-specific language model $CS_RLM$, as well as the general language model 170 and, optionally, one or more additional language models 160, as described later.

The system is configured to identify the context, allowing the text prediction engine to retrieve text predictions from that relevant context-specific language model. In an embodiment, each context is identified by a tag or identifier. The same tag or identifier is associated with its corresponding context-specific language model. Thus, when the context is known to the text prediction engine, the text prediction engine generates text predictions from the context-specific language model with the matching identifier/tag to the known context.

The context may be identified by a context identification module (not illustrated) that is present on the electronic device, for example as part of the messaging application, where the identifier/tag for that context is passed to the text prediction engine, or the context identification module may be part of the prediction engine itself.

Context identification by the context identification module can occur at any time, e.g. when a virtual keyboard is initialised/displayed in a message application of an electronic device (e.g. mobile telephone, tablet or computer, or any other suitable electronic device), when the context changes, or upon every keystroke, etc. By way of non-limiting examples, the context may be identified by the context identification module from the message recipient field for a message (where the context is the recipient), the subject field for the message (where the context is the subject header of the message), or the application the user is composing a message in (where the context is the specific application), or by any other suitable means, as will be described in more detail below.

In an embodiment, the general language model 170 is a general dynamic language model and the context-specific language models 120 ($CS_1LM$, $CS_2LM$, $CS_3LM$) are sub-models of that general dynamic language model 170. Each context-specific language model $CS_1LM$, $CS_2LM$, $CS_3LM$ is trained progressively on user input 110 for that specific context. Each context-specific language model $CS_1LM$, $CS_2LM$, $CS_3LM$ can be trained initially on any existing text which has been input by the user for that context, with the context-specific language model $CS_1LM$, $CS_2LM$, $CS_3LM$ being updated as the user inputs further text 110 relating to that context. Alternatively, context-specific language models 120 can be initiated and trained through use of the text input system 1000, with no prior knowledge of any text input and/or shared for a specific context. The general dynamic language model 170 is trained on all text input into the system, and therefore text relating to the different contexts.

The system does not prune matching terms found in the general language model 170 and the context-specific language models 120, because the context-specific language models are used to effectively re-rank the predictions generated by the general language model 170, which, as described below, requires the matching terms to be retained in the context-specific language models 120.

When a new context (e.g. recipient, subject, etc.) has been identified (for example by the absence of a stored identifier), the prediction engine 1000 may be configured to tag that new context with a new identifier/tag, initiate a new context-specific language model for that new context, and associate that context-specific language model with the same tag/identifier. The text prediction engine 1000 is then configured to train the context-specific language model on text entered for that new context.

Thus, the user input text stream 110, as shown in FIG. 9, is context-specific text input, which refers to the evolving text data generated by the user for a particular context which is then fed back into the relevant context-specific language model $CS_RLM$ as progressive training data. In addition, the text data 110 is used to train the general language model 170, where that language model is dynamic.

The multi-language model (Multi-LM) 180 is configured to combine predictions sourced from the general language model 170 and the relevant context-specific language model $CS_RLM$. The multi-LM 180 will also combine predictions generated by any additional language models 160, as described below. The Multi-LM 180 outputs final predictions 190 that are provided to a user interface for display and user selection. The final predictions 190 are a set of the overall most probable predictions, which may be determined by taking the top n candidates or by taking predictions above a threshold predicted probability. When input into the device (e.g. via automatic selection or by user selection), the inputted text prediction 110 is used to update the relevant dynamic language models, as described previously. Furthermore, the selected/inputted prediction of the text data 110 may be used as context input for the language models 170, 120 to generate the next text predictions from those language models.

The Multi-LM 180 may combine the probabilities for matching candidates in any suitable way in order to provide a final text prediction set with associated probabilities.

As described with respect to the system of FIG. 1, the Multi-LM 180 may order the predictions by their probabilities and return the most probable predictions, where for matching word candidates, the highest probability is retained.

However, text predictions retrieved from a smaller language model, trained on a small amount of data, i.e. a context-specific language model, can be less reliable/accurate than text predictions retrieved from a larger language model, e.g. the general language model (static or dynamic), which has been trained on a large amount of data. In addition, there may be difficulties associated with how to combine the probabilities from larger static or dynamic language models 160, 170 with smaller context-specific language models 120 to provide the benefit of context-specific language models 120, without sacrificing the accuracy of the larger static/dynamic language models 160, 170.

In an embodiment, such a combination may involve providing a context-specific weighting of the predictions from the general (possibly dynamic) language model 170. In particular, this weighting is achieved by weighting the probabilities $P_{GLM}$ from the general language model 170 when those candidate words are also found in the relevant context-specific language model $CS_RLM$ (i.e. for matching candidate words).

In one embodiment, the Multi-LM 180 is configured to apply a context-specific weighting factor when combining the predictions from the relevant context-specific language model $CS_RLM$ and the general language model 170, which weighting factor is tailored to take into account the fact that a smaller language model (e.g. a context-specific dynamic language model $CS_RLM$) may provide less accurate text predictions than a larger language model (e.g. the general language model 170), because it has been trained on much less data than the larger language model. The multi-LM 180 therefore provides a smoothing to the predictions, to prevent skewing of the predictions from the smaller, potentially less accurate, context-specific language models. This approach has the potential to increase the probabilities of words generated by the general language model 170 when those words are usually used by the user for that context (and thus also predicted by the context-specific language model).

In one such embodiment, for matching candidate words, the Multi-LM 180 takes a linear combination of the probabilities from the general language model 170 and the relevant context-specific language model $CS_RLM$ according to the formula $P_C = \alpha P_{GLM} + (1-\alpha) P_{CSRLM}$, where $P_C$ is the combined probability for the candidate word, $P_{GLM}$ is the probability for the candidate word from the general language model 170, $Pcs_RLM$ is the probability for the candidate word from the relevant context-specific language model $CS_RLM$, and $\alpha$ is a fixed global parameter. The fixed parameter $\alpha$ can be chosen to improve the keystrokes saved per character over test data. This fixed parameter $\alpha$, takes a value between zero and 1. The parameter $\alpha$ may be very large (near 1) because most contributions from the context-specific language model $CS_RLM$ are of low count (i.e. the number of times that word appears in the training data for that context-specific language model is low) and thus unreliable. Using a fixed parameter $\alpha$ therefore prevents the skewing of final predictions towards those generated by the smaller context-specific language models. However, the large value of the fixed parameter $\alpha$ limits the effects that the context-specific language model can have on the final combined predictions from the general and context-specific language models.

In an enhancement to this linear combination with a fixed-parameter, the Multi-LM 180 is configured to take a weighted linear combination of the probabilities $P_{GLM}$ and $P_{CSRLM}$, according to the formula $P_C = (1-\lambda) \cdot P_{GLM} + \lambda \cdot P_{CSRLM}$, where the parameter $\lambda$ is based on term count, language or model size information. An embodiment of the weighted linear combination is $P_C = (1-\lambda(word)) \cdot P_{GLM} + \lambda(word) \cdot P_{CSRLM}(word)$, where $\lambda(word)$ explicitly depends on the word being predicted. This means that $\lambda(word)$ will be larger if the word is more frequent in the context-specific language model (e.g. the word is associated with a high frequency of use or number of counts). In one example, the parameter $\lambda(word)$ is based on or equal to the ratio of the word count/probability from the relevant context-specific language model $CS_RLM$ to the word count/probability in the general language model 170. By using a parameter that is dependent on word count in the context-specific language model $CS_RLM$, a word candidate that has a high count (which reflects high confidence) in the context-specific language model can have a greater effect on the combined predictions, thus potentially increasing the accuracy whilst also preventing skewing. The probabilities $P_{CSRLM}$ from the context-specific language model $CS_RLM$ effectively re-rank the probabilities $P_{GLM}$ generated from the dynamic language model 170.

The above described two example approaches to combining predictions enable context-specific language models 120 to be used to provide predictions based on the words previously entered by the user (i.e. context in terms of words preceding the word the system is trying to predict; the context input) and the context (e.g. message recipient, subject, time of day, etc).

Another approach is to use the context-specific unigram probability for the matching candidate word as the weighting factor. The language model therefore provides a probability for a word without considering the context (preceding words) in which it has previously been used (i.e. the language model does not take context as input). The Multi-LM is then configured to take the product of the probabilities from the general language model 170 and the context-specific language model $CS_RLM$, e.g. $P_C = P_{GLM} \cdot P_{CSRLM}$ (unigram)·λ(word), where the probability taken from the general language model 170 can be the unigram probability or the n-gram probability for that word. By taking the n-gram probability the preceding words of context are taken into account when predicting the current word the user is intending to enter. The weighting factor of this example is based on the unigram probability, $P_{CSRLM}$, from the relevant context-specific language model $CS_RLM$, and also the parameter λ(word) (as described above with respect to the weighted linear combination approach).

The probabilities from the dynamic language model 170 are therefore re-ranked based on the unigram probabilities from the relevant recipient-specific language model $CS_RLM$ (assuming that there are some word predictions that are found in both the dynamic language model and the recipient specific language model). It is that the probabilities from the unigram context-specific language models 120 are smoothed by the Multi-LM 180, so that words that have never been used in a given context (i.e. are not present in a context-specific language model) will not result in a zero probability for the combined probability, $P_C$. The Multi-LM 180 is configured to smooth the unigram probabilities by calculating the smoothed unigram probability for a candidate word, $P_s$ (word), from the relevant context-specific language model $CS_RLM$ as follows:

$$P_s(\text{word}) = \frac{\text{count(word)} + \beta}{\sum_i \text{count}(w_i) + \beta}$$

where count(word) is the number of counts of the word in the relevant context-specific language model CSRLM; $\Sigma_i$count($w_i$) is the sum of the counts of all the words in the relevant context-specific language model $CS_RLM$; and β is a tuning parameter which controls how strongly the probability is smoothed and therefore has a value 0≤β<infinity. The general language model 170 and the context-specific language models 120 therefore store counts, in order for the Multi-LM 180 to determine smoothed unigram probabilities based on count rate. The Multi-LM 180 is configured to convert counts into probabilities when comparing predictions from the additional (static) models 160 with the combined predictions generated from the general language model and the context-specific language models, as will be described in more detail below.

In the above described embodiments, if a word is a candidate from the context-specific dynamic language model it will also be a candidate from the general dynamic language model 170, since the general dynamic language model is trained on all text input into the system by the user (i.e. the text for all contexts). However, a context-specific dynamic language model need not predict a word predicted by the general language model 170 since that word may not have been previously used by the user for that context. In these embodiments, the context-specific language models 120 are therefore used to re-rank the predictions from the general language 170, and do not themselves generate word predictions that have not already been generated by the general language model.

In the case of multiple relevant context-specific language models 120, e.g. a message recipient and a message subject, a message subject and a specific application, or where the user is writing to two or more recipients, the relevant contexts may be identified by the context identification module (e.g. as part of the messaging application) as multiple identifiers or a complex identifier for the multiple contexts. The Multi-LM 180 may be configured to determine a weighting factor for each context-specific language model, to generate a weighted linear combination of the probabilities from the language models, or may multiply the probabilities $P_{GLM}$ from the general language model 170 with the unigram probabilities from each of the relevant context-specific language models 120.

Thus, by either method described above, the Multi-LM 180 combines (by addition, weighted addition or multiplication) probabilities for matching words generated by both the general language model 170 and the relevant context-specific language model $CS_RLM$ to generate a set of combined probabilities $P_C$.

The Multi-LM generally has a set of final text predictions from the dynamic language models (i.e. the general language model and the relevant context-specific language model), $P_{FD}$, which comprises the word candidates generated by the general language model 170 (but not generated by the relevant context-specific language model) with associated probabilities $P_{GLM}$ taken from the general language model 170, and words generated by both language models with their associated combined probabilities $P_C$.

The final text predictions from the dynamic language models, $P_{FD}$, can be combined with predictions sourced from one or more static language models, $P_S$, e.g. additional language models 160, to provide a final prediction set $P_F$ which can optionally be displayed on a user interface of an electronic device for user selection. The predictions may be combined by the Multi-LM 180 by inserting the predictions from the language models into an ordered associative structure which may be an ordered STL 'multimap' structure, to order the predictions by their probabilities. For matching words generated by both static and dynamic language models, the highest probability for that word is retained.

In the embodiment in which the Multi-LM 180 takes the product of the unigram probabilities generated by the context-specific language model $CS_RLM$ and the probabilities taken from the general language model 170, the context-specific language model predictions $P_{CSRLM}$ are treated as an independent evidence source. Thus, the text predictions from the static and dynamic language models (as discussed above with respect to system of FIG. 1 or 9) can be combined prior to the Multi-LM taking the product of the combined probabilities with the unigram probabilities, to provide the final text predictions 190 and associated probabilities $P_F$. Integration of the unigram approach is therefore simpler, as the product can be taken before or after combining predictions from the general dynamic language model 170 and static language models 160. However, when performed after combining predictions from the general dynamic 170 and static language models and generating a set of the overall most probable combined predictions, the Multi-LM 180 may generate final predictions 190 which miss a candidate word which had a high probability in the context-specific language model $CS_RLM$, but was not in the set of the overall most probable combined predictions due to the word having a low associated probability in the dynamic and static language models.

In the above embodiments, the text prediction engine 1000 may be configured to prune language models from the plurality of context-specific language models 120, for example by regularly removing context-specific language models 120 based on their size and the current number of context-specific language models 120 in order to reduce memory/storage requirements and increase prediction accuracy due to potential noise from models with low data volumes.

Without employing language model pruning, the text prediction engine 1000 will usually increase the number of context-specific language models 120 as the user continues to enter text 110 via the electronic device (because the user will write to new recipients and write about new subjects etc.) The increase in language models increases memory usage. Memory can be reclaimed by removing the least useful context-specific models. As smaller context-specific language models may result in reduced accuracy, the smallest context-specific language models could be identified as the least useful and hence removed first. Alternatively, or in addition, the time since last usage could be used to determine which context-specific language models 120 are pruned, for example, by pruning context-specific language models 120 relating to hobbies the user is no longer interested in, or relating to recipients the user no longer writes to, etc.

As described above, the general language model 170 is a general dynamic language model that is trained on all text input into the system (e.g. electronic device) by the user, and is therefore equivalent to the user specific language model 7 of system 1.

Figure 10:
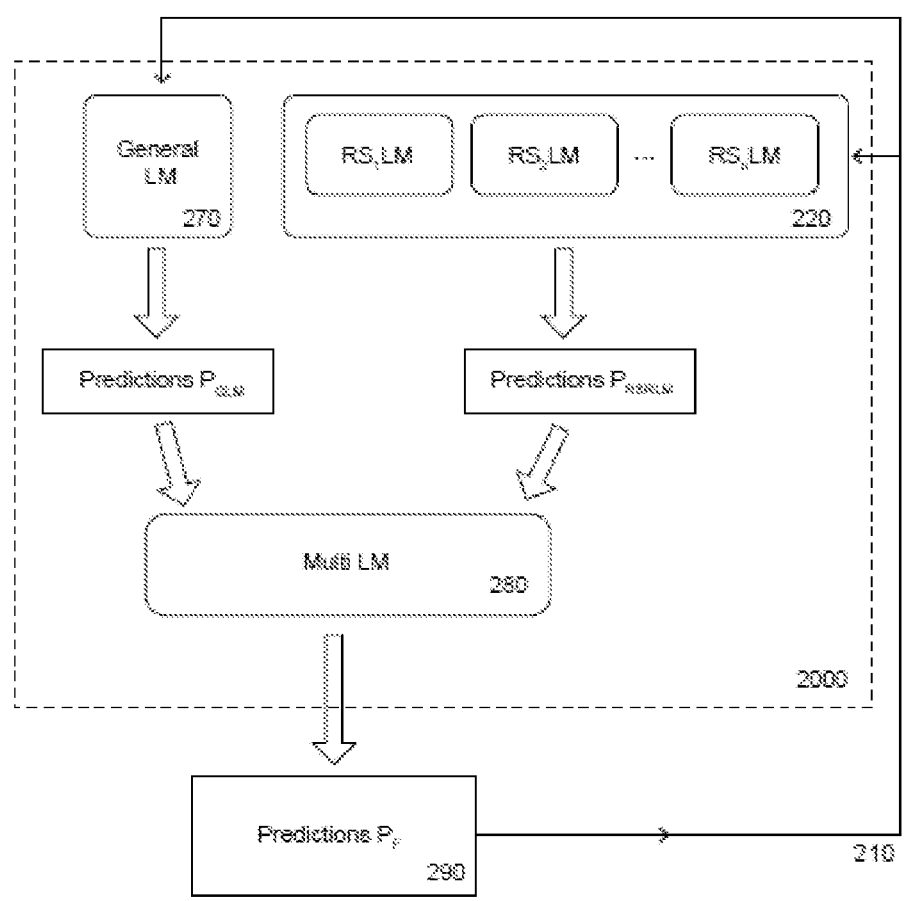
FIG. 10 is an embodiment of the system of FIG. 9, which may take into account a user's typing style dependent on the recipient of a message.

FIG. 10 illustrates an embodiment of the text prediction engine 2000 described with reference to FIG. 9, where the plurality of context-specific language models 120 comprise a plurality of recipient-specific language models 220, $R_1LM$, $R_2LM$, $R_3LM$ . . . . Each recipient-specific language model $R_1LM$, $R_2LM$, $R_3LM$ comprises a dynamic language model trained progressively on user input for that recipient. Each recipient-specific language models 220 can be trained initially on any existing text which has been sent by the user to that recipient. Each language model is then updated (as shown by data stream 210) as the user inputs further text 210 for that recipient. Alternatively, recipient-specific language models 220 can be generated and trained through the use of the text input system 2000, with no prior knowledge of any text shared between that user and each recipient.

The general user-specific dynamic language model 270 is trained on all text input into the device by the user, and therefore includes any text 210 used to train recipient-specific language models 220. The general dynamic language model 270 can therefore be used to predict a user's writing style, even when the user has not written to that recipient before.

The system (e.g. by the context identification module) is configured to determine the recipient or recipients of a message the user is composing in order to determine the relevant recipient-specific language model $R_RLM$ or models for retrieving text predictions. The recipient may be determined by an identifier or tag for each recipient the user has previously written to, as described previously.

The user input text stream 210 of FIG. 10 is a recipient-specific text input which refers to the evolving text data generated by the user to a particular recipient which is then fed back into the relevant recipient-specific language model $R_RLM$, as well as the general dynamic language model 270, as progressive training data and as context input for predicting the next word.

The text prediction engine 2000 is configured to combine predictions $P_{GLM}$, $P_{RRLM}$ sourced from the general language model 270 and the relevant recipient-specific language model $R_RLM$, as described above with respect to combining predictions from a general language model 170 and a context-specific language model $CS_RLM$. As also described above with respect to FIG. 9 (but not shown in FIG. 10), the text prediction engine 2000 may further comprise additional static language models, and the text prediction engine may be configured to combine predictions from the static language models with those predictions combined from the dynamic language models 270, 220.

In certain situations, it may be advantageous to provide a context-specific language model that is a MessageThread-specific language model, which is a language model trained on text for a particular thread of messages only (where that thread may be identified by, for example, a subject header (e.g. by matching terms) or recipient identified by a context-identification module, or by time-based grouping of messages, etc). The MessageThread-specific language model may be advantageous, because the subject and language of the current message in a thread of messages is usually in-keeping with previous messages in the thread. The MessageThread-specific language model may therefore provide accurate predictions for the next word the user is intending to enter. The accuracy/reliability of the text predictions may be expected to increase with the greater size of the messages in the thread and the greater the number of message in the thread. The MessageThread-specific language model differs from the recipient-specific language models 220 described above in that it is trained on text received by a user from a recipient, as well as text sent by a user to the recipient. The general language model of the system of this embodiment may be trained on text input by the user only. The MessageThread-specific language model can therefore be used to generate candidate words which have not been generated by the general language model (where the candidate word has been used by the recipient but not yet the user), as well as re-ranking the probabilities generated by the general language model for matching candidate words. For such a model, the text stream 110 used to update the MessageThread-specific model comprises text received from the recipient as well as user inputted text for that recipient.

The MessageThread-specific language model may be used in the system of FIG. 1, where the Multi-LM takes the highest probability for a matching candidate word predicted from two or more language models, as well as in the systems of FIGS. 9 and 10, where the Multi-LM determines the combined probability from the (dynamic) language model and the MessageThread-specific language model, prior to determining final predictions (which may combine predictions from one or more additional language models).

In addition to, or alternatively to, identifying the relevant recipients and retrieving text predictions from the models corresponding to those recipients, the prediction engine may be configured to identify other context for building context-specific language models and retrieving text predictions from context-specific language models, which by way of non-limiting example may be the time or day of the week on which the message is being composed or the subject of the message. The time of day or day of the week can be taken from an internal time and date information application of an electronic device comprising the text prediction engine of this disclosure. The time of day can be divided into chunks, for building relevant language models, for example, a different language model for each hour of the day, or a different language model for morning, lunchtime and evening, etc. The subject of the message may be taken from the subject field of the message (where identifiers/tags are again used to match subjects to subject-specific language models) or could be determined by a classifier based on the subject field of the message or the current content of the message (e.g. the current text in the body of the message), where a classifier for use in identifying a subject or topic for use by the predictor has been disclosed above and in U.S. patent application Ser. No. 13/501,087, filed Apr. 9, 2012. For either approach of identifying the subject, the prediction engine builds language models for that subject, and maintains those language models by updating them with additional user entered text. The prediction engine is then able to retrieve predictions from those subject-specific language models when one or more of those subjects have been identified by the language model.

The context-specific dynamic language models 120 of FIG. 9 may therefore be one or more of the following: time-specific language models, day/month/year/weekend-specific language models, recipient-specific language models, subject-specific language models, application-specific language models, purpose or application-type specific language models (e.g. the context can relate to all messaging applications), location-specific language models (for example, at home, in the office, on holiday, etc., where the location is determined by, for example, user indication or GPS), or any other suitable context-specific language models.

Figure 11:
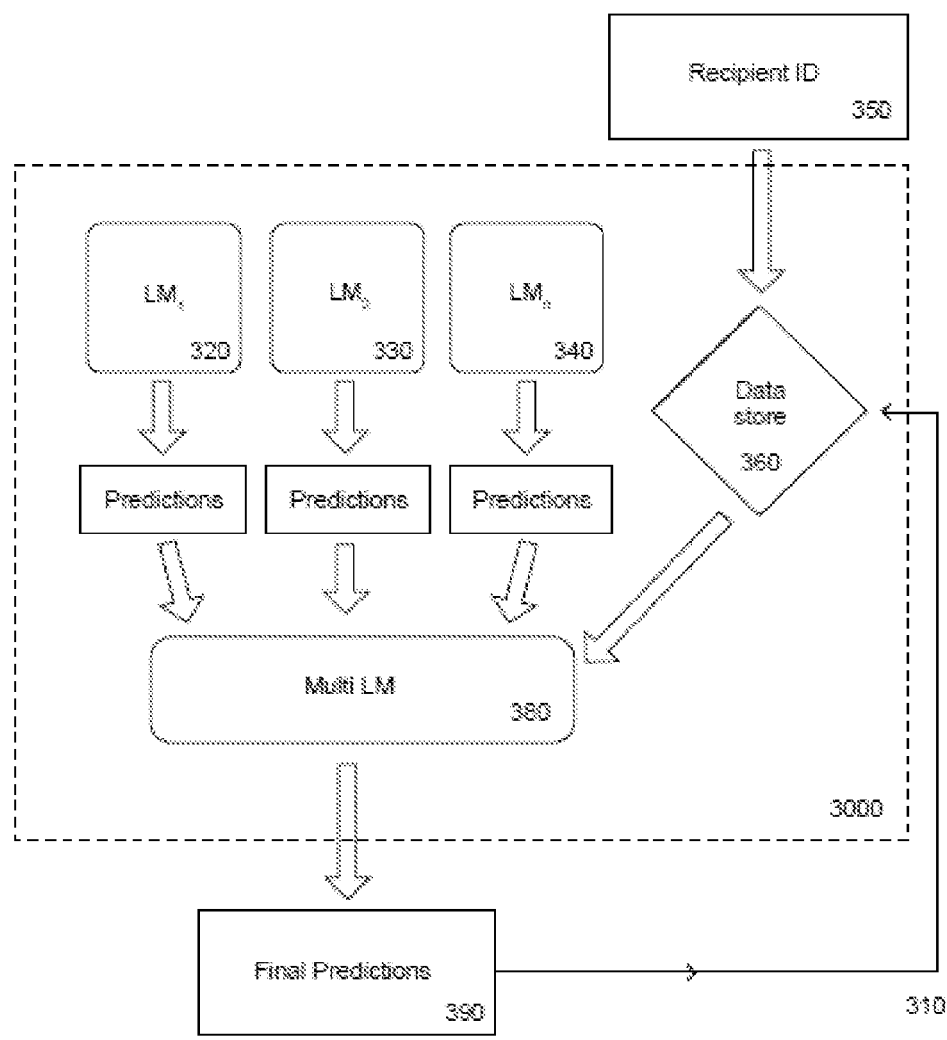
FIG. 11 is a system according to the present disclosure, which may take into account a user's typing style dependent on context.

An alternative system for inputting text into electronic devices, which may take into account user typing styles dependent on context is now described with respect to the system of FIG. 11. The system comprises a text prediction engine 3000 comprising a plurality of language models 320, 330, 340, a Multi-LM 380 and a data store 350 having stored therein a set of context-specific parameters. The context-specific parameters comprise a context-specific weighting factor for each language model 320, 330, 340 of the system, where that context-specific weighting factor is dependent on previous user use of that language model when inputting text for that context.

Thus, the system of FIG. 11 can comprise all of the features of the system of FIG. 1, but differs in that it comprises a data store 350 having stored therein a set of context-specific parameters.

The text prediction engine 3000 is configured to generate concurrently using user text input text predictions from each of the plurality of language models 320, 300, 340. The Multi-LM 380 is configured take the products of the probabilities of the text predictions generated from a given language model and the context-specific weighting factor associated with that language model. The Multi-LM 380 is then configured to combine the weighted predictions from the multiple language models to provide a final set of text predictions 390, which may include for example, the top n most likely text predictions.

A difference between this system and that described with respect to FIGS. 9 and 10 is that new language models are not required in order to take into account user typing styles dependent on context.

In a simple example, the language in which a bilingual (French and English) user writes will depend on who they are writing to. For example, they may write in only French to their French mother or in a mixture of languages to their friend who speaks French and English. For the mother, the weighting factor associated with the French language model will be higher than the weighting factor associated with the English language model, whereas for the friend the weighting factors associated with the English and French language models might be more similar.

As described above with respect to FIGS. 9 and 10, the context of interest may be one or more of the message recipient, the software application, the time of the day or day of the week, the message subject, purpose or application-type, location, etc.

In an embodiment of the present disclosure, the context of interest is the recipient 350 to whom the user is composing a message. For each recipient, the data store 360 comprises a recipient-specific weighting factor associated with each language model 320, 330, 340 of the text prediction engine 3000. The recipient-specific parameters may therefore comprise pairs of language models identifiers and weighting factors for each known recipient.

Since the recipients are identified by an identifier, the parameters comprise triplets of recipient identifier, language model identifier, and language model weighting factor.

When a recipient has been identified (which, as described above can be via the user selecting or inputting a recipient into the 'To field'), the identifier 350 of that recipient is used by the prediction engine 3000 to retrieve from the data store 360 the weighting factor that is to be applied by the Multi-LM 380 to the probabilities retrieved from a given language model 320, 330, 340 (i.e. the Multi-LM 380 takes the products of the probabilities from the language model with the weighting factor for that recipient and that language model). For example, for $LM_1$ with associated weighting factor $WF_1$, the Multi-LM calculates $P(word_1) \cdot WF_1$; $P(word_2) \cdot WF_1$; $P(word_3) \cdot WF_1 \ldots P(word_n) \cdot WF_1$, where P(word) is the probability associated with a word generated by LM1.

The data store 360 may be part of the Multi-LM 390 or may be separate from the Multi-LM 390 (as illustrated).

Thus, relative to the system of FIG. 1, the Multi-LM 390 outputs a re-ranked set of final probability predictions 390, where the re-ranking has been achieved via the recipient-specific weighting factors stored in the data store 360.

If a new recipient is identified 350, the prediction engine 3000 assigns a new identifier to that recipient and creates a new set of recipient-specific parameters in the data store 360. The text prediction engine 3000 may be configured to set the weighting factors for a new recipient at a neutral value, e.g. 1, so that none of the language models 320, 330, 340 has a greater weighting factor than the others. With use, the weighting factors will be updated dependent on the use of the language models 20, 330, 340.

A simple weighting factor may be determined for a language model by taking the ratio of the number of words selected/inputted by a user for that language model and context over the total number of words selected/inputted by the user into the device for that context.

In an embodiment, the weighting factor for a given language model is bumped up a little if a prediction from that language model is input, and the weights for the other language models are all bumped down a little. The function to do this bumping up/down is an exponential smoothing algorithm.

This described system therefore weights all text probabilities generated by a given language model with a given context-specific weighting factor, dependent on how much that context is used by the user when inputting text for that context.

The Multi-LM 390 does this weighting (by multiplying the prediction probabilities retrieved from each language model 320, 330, 340 by their associated weighting factor) prior to ordering the predictions and retrieving the top N most probable candidates 390, where for matching candidate words, the prediction with the highest probability is retained.

The weighting factor associated with each model 320, 330, 340 is adaptive, and is updated with the use of the language models 320, 330, 340 for specific context. Thus, the prediction engine 3000 retains the association (e.g. tag/identifier) between a prediction 390 and the language model 320, 330, 340 from which it was generated. Thus, when a prediction is selected by a user, the appropriate language model weighting factor can be updated (as shown by data stream 310). If present, a dynamic language model can also be updated once a prediction is selected. Furthermore, the language models may take the selected/input prediction 390 as context input for generating new predictions.

The present disclosure also provides corresponding methods for inputting text into electronic devices, which may take into account user typing styles dependent on context.

A first aspect of a method of the present disclosure comprises receiving at a user interface of an electronic device text input by a user; generating concurrently, using a text prediction engine 1000 comprising a general language model 170 and a context-specific language model 120, text predictions from the general language model and the context-specific language model; and combining, using the text prediction engine 1000, the text predictions generated from the general language model and the context-specific language model.

A second aspect of a method of the present disclosure comprises receiving at a user interface of an electronic device text input by a user; generating using a prediction engine 3000 comprising a first language model 320 and a first context-specific weighting factor associated with the first language model and a second language model 330, text predictions using the first language model and the second language model. The method further comprises generating using the text prediction engine 3000 weighted probabilities of the text predictions from the first language model 320 using the first context-specific weighting factor; and generating using the text prediction engine final text predictions 390 from the weighted predictions generated from the first language models and the text predictions generated from the second language model. The text final text predictions may be displayed on a user interface for user selection. The text prediction engine 3000 comprises a second context-specific weighting factor associated with the second language model 330, and the method further comprises generating weighted probabilities of the text predictions from the second language model 330 using the second context-specific weighting factor; and generating final text predictions 390 from the weighted predictions generated from the first and second language models.

Other aspects of the methods of the present disclosure can be readily determined by analogy to the above system description.

The present disclosure also provides a computer program product comprising a computer readable medium having stored thereon computer program means for causing a processor to carry out one or more of the methods according to the present disclosure.

The computer program product may be a data carrier having stored thereon computer program means for causing a processor external to the data carrier, i.e. a processor of an electronic device, to carry out the method according to the present disclosure. The computer program product may also be available for download, for example from a data carrier or from a supplier over the internet or other available network, e.g. downloaded as an app onto a mobile device (such as a mobile phone or tablet) or downloaded onto a computer, the mobile device, tablet or computer comprising a processor for executing the computer program means once downloaded.

It will be appreciated that this description is by way of example only; alterations and modifications may be made to the described embodiment without departing from the scope of the invention as defined in the claims.

What is claimed:
1. A system comprising:
a processor; and
memory storing instructions that, when executed by the processor, configure the processor to:
receive text input by a user;
generate at least one first text prediction, each first text prediction comprising a first term and a first associated probability value, based on the received text input, using a general language model;
generate at least one second text prediction, each second text prediction comprising a second term and a second associated probability value, based on the received text input, using a context-specific language model, wherein the context-specific language model is trained on user input text inputted during a specific time period;
combine the at least one first text prediction generated using the general language model and the at least one second text prediction generated using the context-specific language model; and
output one or more of the combined text predictions.
2. The system of claim 1, wherein the general language model is a dynamic language model.
3. The system of claim 1, wherein the context-specific language model is a dynamic language model.
4. The system of claim 1, wherein the context-specific language model further comprises a MessageThread-specific language model, a recipient-specific language model, or a location-specific language model.
5. The system of claim 1, wherein the specific period of time comprises at least one of: a day, month, year, or weekend.
6. The system of claim 1, wherein at least one of the first text prediction or the second text prediction comprises a word candidate, and wherein when a word candidate generated using the general language model matches a word candidate generated using the context-specific language model, the processor is configured to apply a weighting factor to the probability of the word candidate generated using the general language model.

7. The system of claim 6, wherein the weighting factor is based on the probability of that word generated using the context-specific language model.

8. The system of claim 7, wherein the instructions, when executed by the processor, configure the processor to generate at least one third text prediction using a static language model, and wherein the processor is configured to combine the at least one first text prediction generated using the general language model, the at least one second text prediction from the context-specific language model and the at least one third text prediction from the static language model to generate a final set of text predictions.

9. The system of claim 8, wherein if a word candidate is generated by all language models the processor outputs the word candidate with a third associated probability, wherein the third associated probability is the greatest of a probability from the static language model and the product of the first and second probabilities from the general language model and the context-specific language model.

10. The system of claim 1, wherein at least one of the first text prediction or the second text prediction comprises a word candidate, and wherein when a word candidate generated using the general language model matches a word candidate generated using the context-specific language model, the processor is configured to calculate a linear combination of the first and second associated probability values generated by the general language model and the context-specific language model for that matching word.

11. The system of claim 10, wherein the processor calculates a weighted linear combination, wherein the weighting factor is based on a ratio of the second associated probability value of that word in the context-specific language model to the first associated probability value of that word in the general language model.

12. The system of claim 11, wherein the instructions, when executed by the processor, configure the processor to generate at least one third text prediction from a static language model, and combine the at least one first text prediction from the general language model, the at least one second text prediction from the context-specific language model and the at least one third text prediction from the static language model to generate a final set of text predictions.

13. The system of claim 12, wherein if a word candidate is generated by all language models the processor outputs the word candidate with a third associated probability, wherein the third associated probability is the greatest of a probability from the static language model and the weighted linear combination of the first and second associated probability values generated by the general language model and the context-specific language model.

14. The system of claim 1, wherein when the first term matches the second term, the step of combining comprises retaining the first prediction or the second prediction, dependent on whether the first associated probability value or the second associated probability value is highest.

15. The system of claim 1, wherein the context-specific language model comprises one of the group of: an application-specific language model, a purpose or application-type specific language model, a company-specific language model, a user community-specific language model or a user language model.

16. A system comprising;
a processor; and
memory storing instructions that, when executed by the processor, configure the processor to:
receive text input by a user;
generate at least one first text prediction, each first text prediction comprising a first term and a first associated probability value, based on the text input by a user, using a first language model;
generate at least one second text prediction, each second text prediction comprising a second term and a second associated probability value, based on the text input by a user, using a second language model;
generate at least one weighted probability of the at least one first text prediction from the first language model using a first context-specific weighting factor, wherein the context-specific weighting factor is dependent on previous user's use of that language model when inputting text for that context; and
generate final text predictions from the at least one weighted prediction generated from the first language model and the at least one second text prediction generated from the second language model.

17. The system of claim 16, wherein the instructions, when executed by the processor, further configure the processor to generate weighted probabilities of the at least one second text prediction from the second language model using a second context-specific weighting factor; and
generate final text predictions from the weighted predictions generated from the first and second language models.

18. The system of claim 17, wherein the instructions, when executed by the processor, further configure the processor to generate text predictions using additional language models, each additional language model having an additional context-specific weighting factor associated with it.

19. The system of claim 18, wherein the system further comprises a data store having stored within it a set of context-specific parameters, the set of context-specific parameters comprising, for each context, a weighting factor for each language model.

20. The system of claim 19, wherein the context-specific parameters are recipient-specific parameters.

21. The system of claim 20, wherein the processor is configured to retrieve from the data store the recipient-specific weighting factors associated with a recipient to whom a message is being composed, and is configured to apply the respective recipient-specific weighting factor to the probabilities of the text predictions from each language model.

22. The system of claim 19, wherein the context-specific weighting factors are dynamic and are updated by the processor with use of the system.

23. A system comprising:
a processor; and
memory storing instructions that, when executed by the processor, configure the processor to:
receive text input by a user;
generate at least one first text prediction, each first text prediction comprising a first term and a first associated probability value, based on the text input by the user, using a general language model;
generate at least one second text prediction, each second text prediction comprising a second term and a second associated probability value, based on the text input by the user, using one of a plurality of recipient-specific dynamic language models, wherein each recipient-specific dynamic language model is trained on text sent to that recipient; and combine the at least one first text prediction generated from the general language model and the at least one second text prediction from the one of the plurality of recipient-specific dynamic language models.

24. The system of claim 23, wherein the general language model is a general dynamic language model trained on user inputted text.

25. A non-transitory computer readable medium containing program instructions which, when executed by a processor, configure the processor to:

generate at least one first text prediction, each first text prediction comprising a first term and a first associated probability value, based on the text input by the user, using a general language model;

generate at least one second text prediction, each second text prediction comprising a second term and a second associated probability value, based on the text input by the user, using one of a plurality of recipient-specific language models, wherein each recipient-specific language model is trained on text sent to that recipient; and combine the at least one first text prediction generated from the general language model and the at least one second text prediction from the one of a plurality of recipient-specific language models.

26. A system comprising:

a processor; and memory storing instructions that, when executed by the processor, configure the processor to:

receive text input by a user;

generate at least one first text prediction, each first text prediction comprising a term and a first associated probability value, based on the received text input, using a general language model;

generate at least one second text prediction, each second text prediction comprising a second term and a second associated probability value, based on the received text input, using a context-specific language model, wherein the context-specific language model is trained on user input text inputted from a specific location;

combine the at least one first text prediction generated using the general language model and the at least one second text prediction generated using the context-specific language model; and output one or more of the combined text predictions.

* * * * *